(12) United States Patent (10) Patent No.: US 8,023,912 B2
Petrovic et al. (45) Date of Patent: Sep. 20, 2011

(54) CIRCUITS, SYSTEMS AND METHODS FOR FREQUENCY TRANSLATION AND SIGNAL DISTRIBUTION

(75) Inventors: Branislav Petrovic, San Diego, CA (US); Peter Doherty, San Diego, CA (US); Yong Zeng, San Diego, CA (US)

(73) Assignee: RF Magic, Inc., San Diego, CA (US)

( * ) Notice: Subject to any disclaimer, the term of this patent is extended or adjusted under 35 U.S.C. 154(b) by 702 days.

(21) Appl. No.: 12/015,773

(22) Filed: Jan. 17, 2008

(65) Prior Publication Data

US 2008/0132193 A1 Jun. 5, 2008

Related U.S. Application Data

(63) Continuation of application No. 11/934,486, filed on Nov. 2, 2007, now abandoned.

(60) Provisional application No. 60/864,352, filed on Nov. 3, 2006, provisional application No. 60/885,814, filed on Jan. 19, 2007, provisional application No. 60/886,933, filed on Jan. 28, 2007.

(51) Int. Cl.
*H04B 1/16* (2006.01)
(52) U.S. Cl. .......... 455/140; 455/3.02; 455/323
(58) Field of Classification Search ........... 455/3.01, 455/3.02, 3.03, 3.04, 12.1, 103, 132–137, 455/140, 141, 323
See application file for complete search history.

(56) References Cited

U.S. PATENT DOCUMENTS

| | | | |
|---|---|---|---|
| 5,073,930 A | | 12/1991 | Green |
| 5,276,904 A | | 1/1994 | Mutzig et al. |
| 5,956,620 A | * | 9/1999 | Lazaris-Brunner et al. . 455/12.1 |
| 5,959,592 A | | 9/1999 | Petruzzelli |
| 6,341,213 B1 | * | 1/2002 | Wu .............................. 455/12.1 |
| 6,408,164 B1 | * | 6/2002 | Lazaris-Brunner et al. . 455/12.1 |
| 6,424,817 B1 | | 7/2002 | Hadden et al. |
| 6,600,730 B1 | | 7/2003 | Davis et al. |
| 6,832,071 B1 | * | 12/2004 | Nakamura et al. ........... 455/3.02 |
| 7,130,576 B1 | | 10/2006 | Gurantz et al. |

(Continued)

FOREIGN PATENT DOCUMENTS

EP 0 800 314 10/1997

(Continued)

OTHER PUBLICATIONS

Courtesy the International Search Report from PCT application PCT/US2007/089192.

*Primary Examiner* — Blane J Jackson

(74) *Attorney, Agent, or Firm* — Clifford Perry; Bruce W. Greenhaus

(57) ABSTRACT

Circuits systems and methods for frequency translation and signal distribution includes a downconverter circuit having first and second inputs coupled to receive respective first and second input signals, and an output for providing a downconverted output signal. The downconverter circuit includes a mixer circuit, a first switch, and a second switch. The mixer includes a first input coupled to a reference source, a second input, and an output coupled to the downconverter circuit output. The first switch includes a first port coupled to the downconverter circuit first input, and a second port switchably coupled to the mixer circuit second input. The second switch includes a first port coupled to the downconverter circuit second input, and a second port switchably coupled to the mixer circuit second input.

22 Claims, 22 Drawing Sheets

U.S. PATENT DOCUMENTS

| | | | |
|---|---|---|---|
| 7,555,258 B2 * | 6/2009 | Sakurai et al. | 455/3.02 |
| 7,848,303 B2 * | 12/2010 | Lindstrom et al. | 370/343 |
| 2004/0029549 A1 | 2/2004 | Fikart | |
| 2004/0209584 A1 | 10/2004 | Bargroff | |
| 2004/0235415 A1 | 11/2004 | Atarashi | |

FOREIGN PATENT DOCUMENTS

| | | |
|---|---|---|
| EP | 1 089 469 | 4/2001 |
| WO | WO 02/51015 | 6/2002 |
| WO | 2005109703 A | 11/2005 |
| WO | 2006119397 A | 11/2006 |

* cited by examiner

282
Provide plurality of switch matrices, each having at least one input and N output ports

284
Provide plurality of N signal combiners, each combiner having an input coupled to one of the N outputs of the switch matrices

FIG. 2E

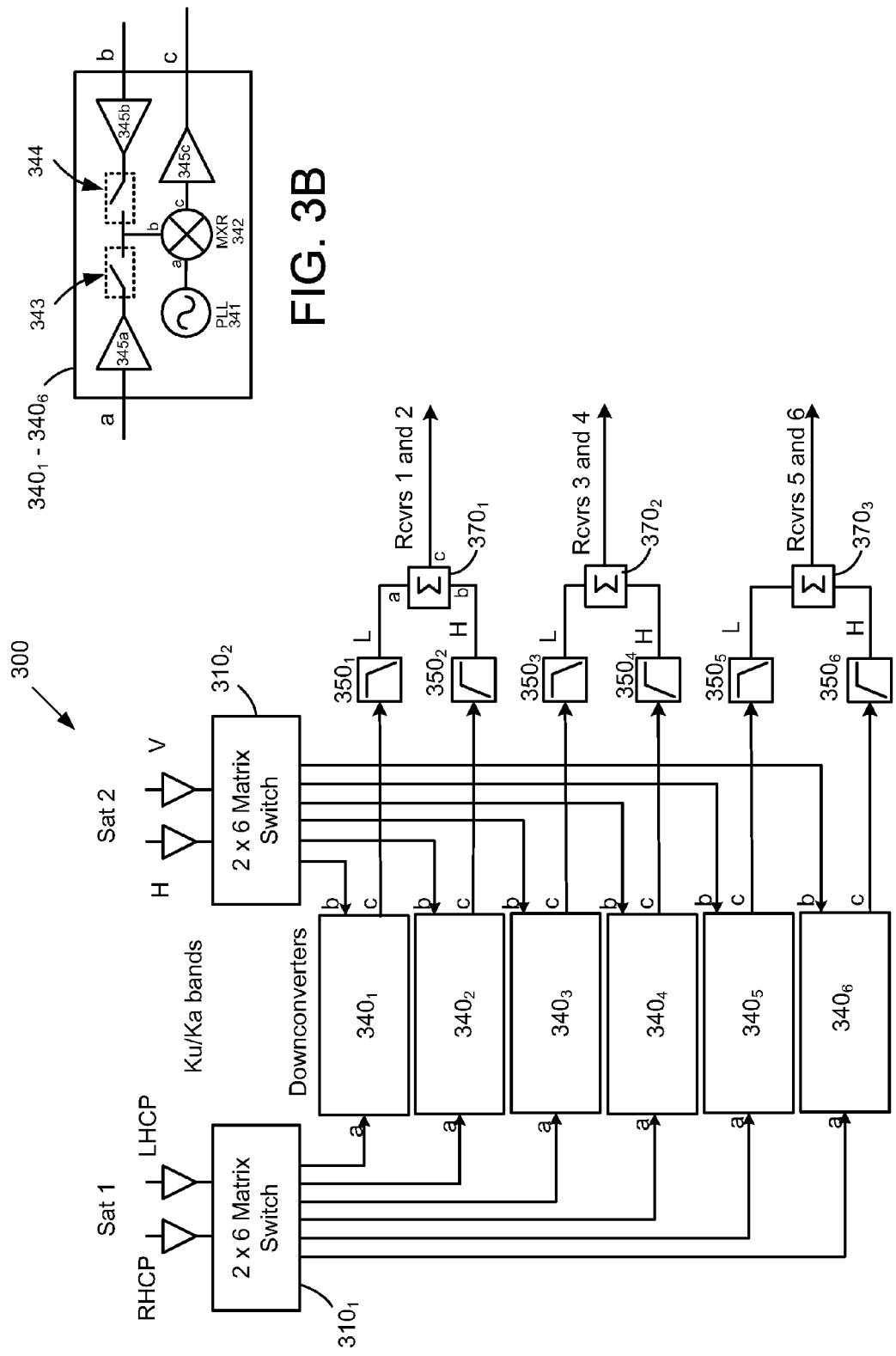

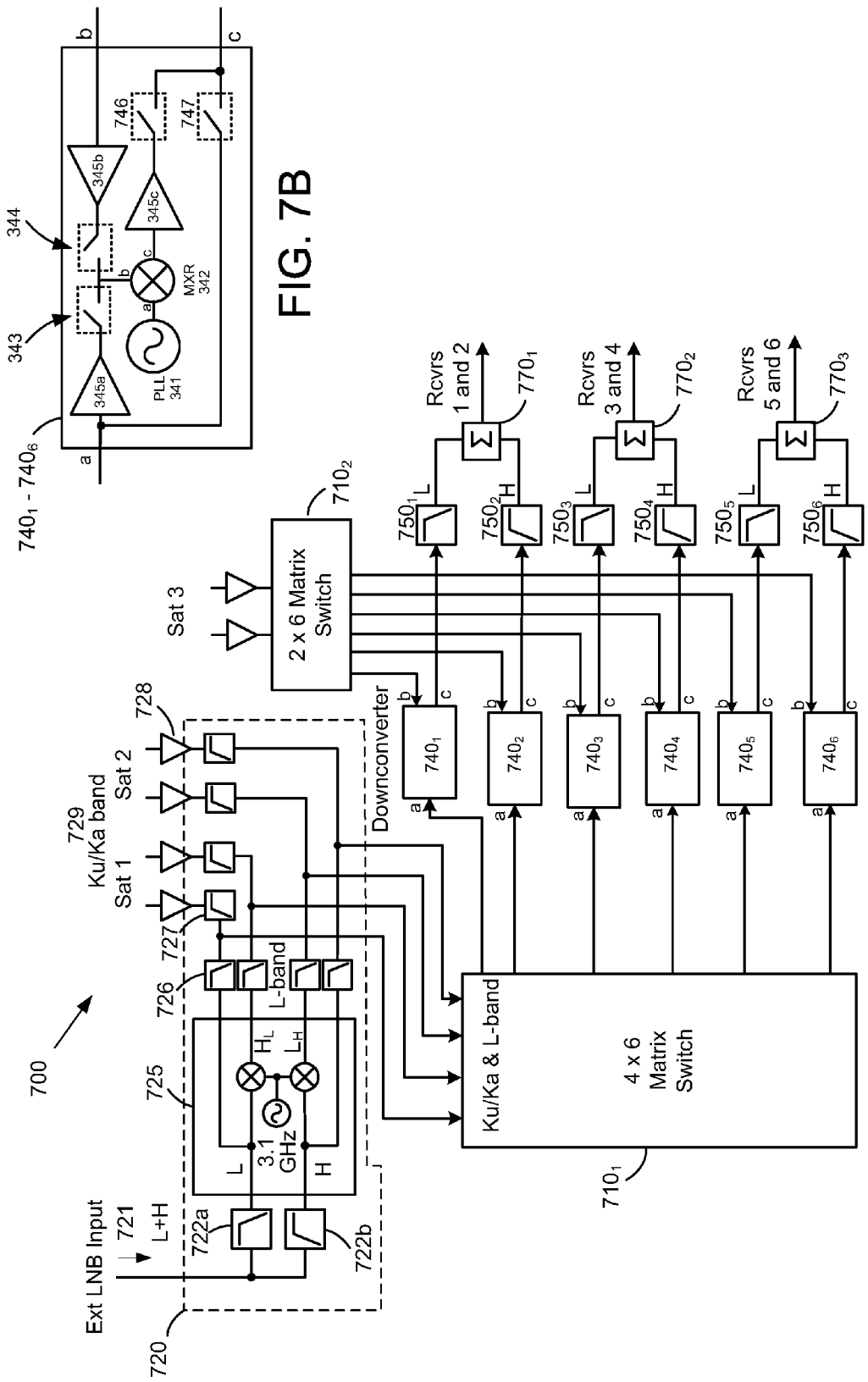

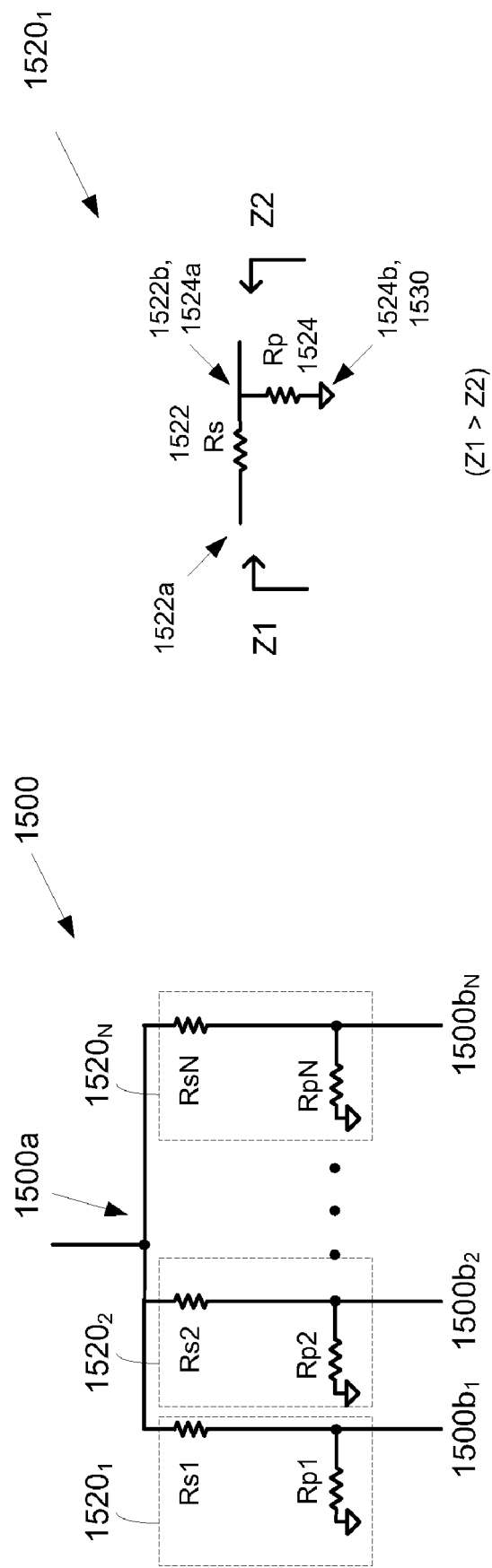

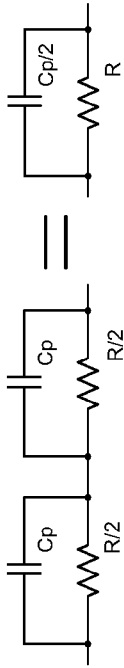
Resistor with parasitic capacitance
FIG. 17A
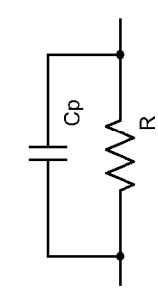
Two series resistors of the same type reduce equivalent parasitic capacitance by half
FIG. 17B
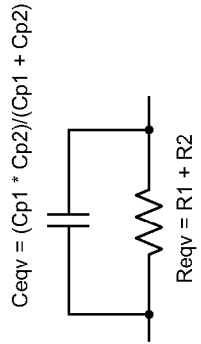
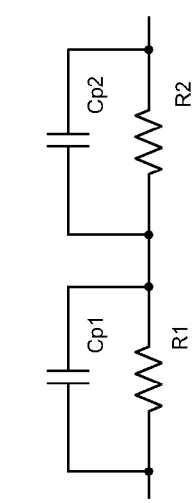
Two series resistors of different types can also reduce equivalent parasitic capacitance
FIG. 17C

CIRCUITS, SYSTEMS AND METHODS FOR FREQUENCY TRANSLATION AND SIGNAL DISTRIBUTION

CROSS REFERENCE TO RELATED APPLICATIONS

This application is a continuation of U.S. patent application Ser. No. 11/934,486, filed Nov. 2, 2007, which claims the benefit of priority of each of the following applications:

U.S. provisional application No. 60/864,352, filed Nov. 3, 2006, entitled "Satellite Signal Frequency Translation and Stacking";

U.S. provisional application No. 60/885,814, filed Jan. 19, 2007, entitled "Circuits, Systems and Methods for Constructing a Composite Signal;" and U.S. provisional application No. 60/886,933, filed Jan. 28, 2007, entitled "Circuits, Systems and Methods for Frequency Translation and Signal Distribution." The contents of each of the above-identified patent application Ser. Nos. 11/934,486, 60/864,352, 60/885,814, and 60/886,933 are herein incorporated by reference for all purposes.

BACKGROUND

The present invention relates to circuits, systems and methods for processing signals, and particularly, to circuits, systems and methods for frequency translation and distribution of signals.

Composite signals are formed by assembling two or more signals into a combined signal spectrum, and find utility in many applications. For example, systems used to distribute satellite television signals often employ means to construct composite signals, whereby various channels or bands of channels originating from several different satellites are assembled into a composite signal over which a user's set top box or other receiver can tune. Switch matrices are often used in such systems, whereby a particular input signal (e.g., a Ku or Ka-band satellite signal) is supplied to an input of a switch matrix, and the switch matrix controlled so as to provide that signal to one or more of the switch matrix outputs. Two or more of such signals, each typically representing a different signal spectrum (i.e., containing different channels, or bands of channels) are combined (using, e.g., a diplexer or signal combiner network) and possibly frequency-translated to a second frequency (e.g., upper and lower L-band frequencies, 950-1450 MHz and 1650-2150 MHz), the combination of the two signals representing a composite signal that is supplied to a user for demodulation and/or baseband processing.

FIG. 1 illustrates a conventional system operable to distribute satellite television signals. The system is configured to receive signals from two satellite signal sources and to output two composite signals, each composite signal typically including a portion of each of the two satellite signals, and each composite signal supplied to a dual channel receiver (or two individual receivers). Each antenna receives two signals of different polarizations, typically having channel frequencies offset by half-channel width or having the same channel frequencies. In direct broadcast satellite (DBS) applications, the polarization is typically circular, having right-hand (R1 and R2) and left-hand (L1 and L2) polarized signals as labeled in FIG. 1. Signals can also be linearly polarized with horizontal and vertical polarizations.

The received signals are processed in a low noise block-converter 108 consisting of low noise amplifiers 107 (typically 2 or 3 amplifiers in a cascade), filters 109 (typically bandpass filters providing image rejection and reducing out of band power) and frequency converter block 110. The converter block 110, performing frequency downconversion, contains local oscillators LO1 114 and LO2 112 typically of the DRO (dielectric-resonator oscillator) types, mixers and post-mixer amplifiers. The two mixers driven by LO1 downconvert the signals to one frequency band (lower—L) while the mixers driven by LO2 downconvert to a different frequency band (higher—H). The L and H bands are mutually exclusive, do not overlap and have a frequency guard-band in between. The L and H band signals are then summed together in a separate combiner 116 in each arm, forming a composite signal having both frequency bands ("L+H", which is often referred to as a "band-stacked signal" when the added signal components are bands of channels, or a "channel-stacked signal" when the added signal components are individual channels) which is then coupled to a 2×4 switch matrix/converter block 120.

The switch matrix 130 routes each of the two input signals to selected one or more of the 4 outputs, either by first frequency converting the signals in the mixers 128 driven by LO3 132 or directly via the bypass switches around the mixers (the controls for the switch and mixer bypass not shown in the figure). The frequency of the LO3 is chosen such that the L-band converts into the H band, and vice versa, which is referred to as the "band-translation". This is accomplished when the LO3 frequency is equal to the difference of the LO2 and LO1 frequencies.

The outputs of the matrix switch/converter block 120 are coupled through diplexers consisting of a high-pass filter 122, low-pass filter 124 and a combiner 126 (as shown in the upper arm, the lower arm being the same) providing two dual receiver outputs 118 and 134. The filters 122 and 124 remove the undesired portion of the spectrum, i.e. the unwanted bands in each output. Each of the two outputs 118 and 134 feeds via a separate coaxial cable a dual receiver, for a total capability of four receivers. By controlling the matrix switch routing and the mixer conversion/bypass modes, a frequency translation is accomplished and each of the four receivers can independently tune to any of the channels from either polarization of either satellite.

While operational, the conventional system suffers from some disadvantages, one of which is the relatively low source-to-source isolation the system exhibits. In particular, the low noise converter block 108 and the switch matrix converter block 120 each may exhibit low isolation between their respective signal paths, which may lead to cross-coupling of the signals, and contamination of the composite signal with unwanted signal content. This cross-coupling effect becomes especially acute when the sources operate at high frequencies and over the same band, conditions which exist in the aforementioned satellite TV distribution system, whereby both satellite sources operate over the same Ku or Ka-band.

A further disadvantage of the conventional system is that multiple frequency translations are needed to provide the desired composite output signal. In particular, the low noise block converter 108 provides a first frequency translation, e.g., to downconvert the received satellite signal from Ku-band to L-band, and the switch matrix/converter 120 provides a second frequency translation, e.g., to translate the downconverted signal from a lower band to an upper band, or visa versa. Multiple frequency conversions increase the system's complexity, cost, and power consumption, as well as degrade signal quality.

SUMMARY

This invention provides for simultaneous and independent reception by a multiplicity of receivers of the channels carried on the same frequency band but through different, multiple transmission paths by enabling individual receivers to independently tune to any channel on any path. The signal routing is accomplished by means of downconverter circuit having first and second inputs coupled to receive respective first and second input signals, and an output for providing a downconverted output signal. The downconverter circuit includes a mixer circuit, and first and second switches. The mixer includes a first input coupled to a reference frequency source, a second input, and an output coupled to the downconverter circuit output. The first switch includes a first port coupled to the downconverter circuit first input, and a second port switchably coupled to the mixer circuit second input. The second switch includes a first port coupled to the downconverter circuit second input, and a second port switchably coupled to the mixer circuit second input.

Other features and advantages of the invention will be understood in view of the following drawings and detailed description of exemplary embodiments.

BRIEF DESCRIPTION OF THE DRAWINGS

FIG. 2E illustrates a method for constructing a switch matrix circuit in accordance with the present invention.

FIGS. 3A and 3B illustrate exemplary embodiments of a frequency translation and signal distribution system and corresponding downconverter circuit, respectively, in accordance with an embodiment of the present invention.

FIGS. 7A and 7B illustrate an exemplary embodiment of a frequency translation and signal distribution system, and corresponding downconverter circuit, respectively, in accordance with an embodiment of the present invention.

FIG. 15 illustrates an exemplary embodiment of an N-way resistive divider circuit in accordance with one embodiment of the present invention.

FIG. 16 illustrates an impedance transformer implemented in the N-way resistive divider circuit of FIG. 15 in accordance with one embodiment of the present invention.

FIGS. 17A-17C illustrates parasitic capacitance associated with the resistive elements employed in the resistive divider circuit of FIG. 15.

For clarity, previously-identified features retain their reference numbers in subsequent drawings.

DETAILED DESCRIPTION OF EXEMPLARY EMBODIMENTS

Figure 2A:
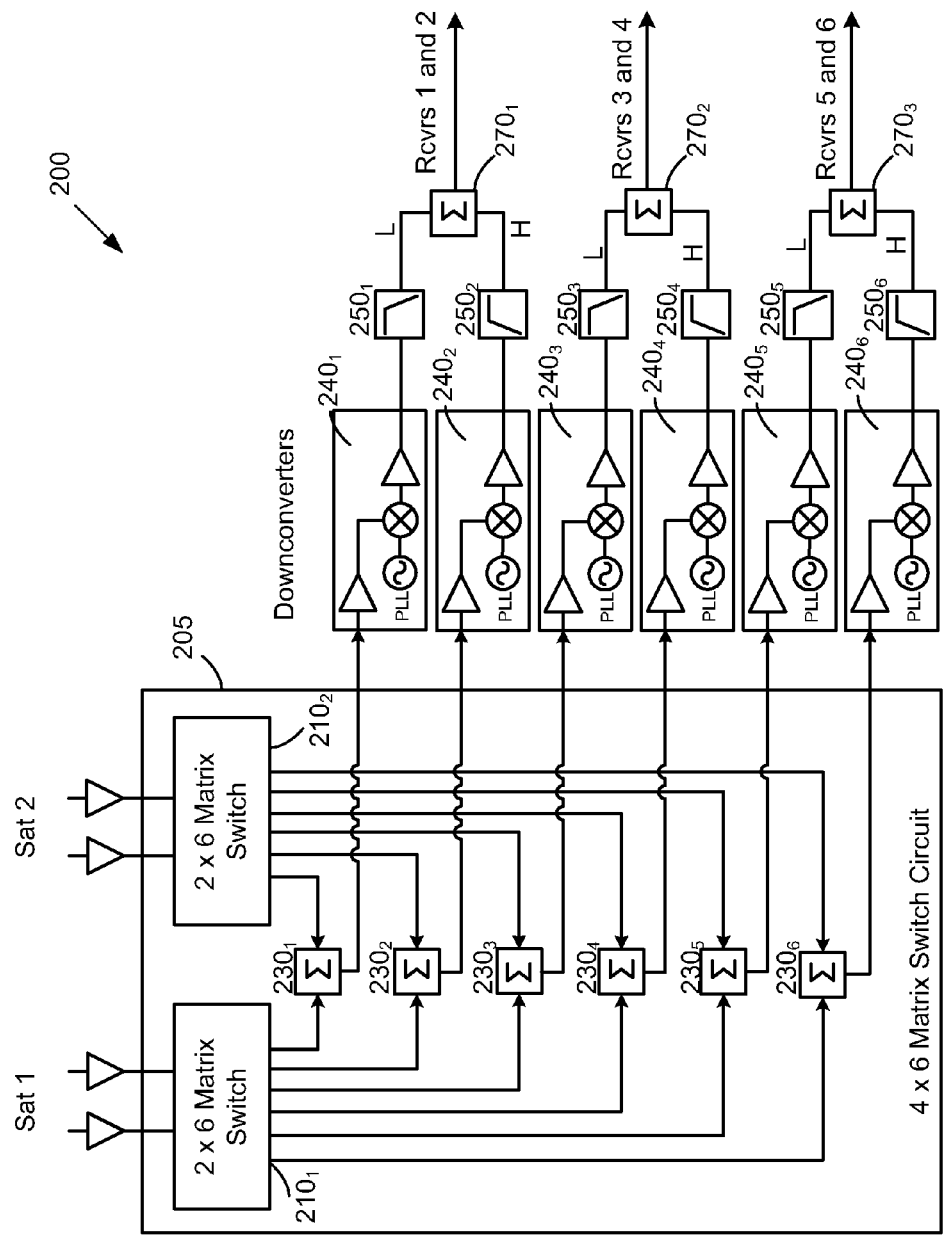
FIG. 2A illustrates a first exemplary embodiment of a switch matrix circuit in accordance with the present invention.

FIG. 2A illustrates a first exemplary switch matrix circuit 205 in accordance with the present invention. This figure, as with all the provided figures, is shown for illustrative purposes only and does not operate to limit the possible embodiments of the present invention or the claims. Although omitted to promote clarity and simply the drawings, power and control signals are coupled to each of the illustrated components for activating and controlling said components to operate as described herein. Those skilled in the art will appreciate that power and control signals may be routed to the respective components in a variety of different manners, and the invention is not limited to any particular type of control or power signal routing technique.

The switch matrix circuit 205 includes a plurality of switch (i.e., signal) matrices 210, and a plurality of combiners 230. Each switch matrix 210 includes at least one input port operable to receive a respective one input signal, and a plurality of output ports, each switch matrix 210 operable to couple a signal received on its at least one input port to any of its output ports. In the illustrated embodiment of FIG. 2A, two switch matrices $210_1$ and $210_2$ are shown, although in alternative embodiments, three, four, five, six, eight, 10, 12, 14, 16, 20, 100 or more switch matrices may be implemented in alternative embodiments. Also exemplary, two input ports are shown for each switch matrix 210, although one, three, four, five, six, eight, 10, 12, 14, 16, 20, 100 or more input ports may be implemented in alternative embodiments. Further exemplary, each switch matrix $210_1$ and $210_2$ is shown as having six output ports, although under alternative embodiments of the invention, any plurality of outputs (two, three, four, five, eight, 10, 20, 100 or more) may be employed.

Each comber 230 includes a plurality of inputs and a combiner output, such that each combiner input port is coupled to a respective one output port of one switch matrix 210, and whereby the combiner input ports are coupled to respective output ports of different matrices 210. In the example shown in FIG. 2A, each combiner $230_1$-$230_6$ includes two inputs, each input coupled to an output of one of the switch matrices $210_1$ or $210_2$. In an alternative embodiment in which three or more switch matrices are used, each of the combiners $230_1$-$230_6$ will have a respective three or more input ports, each combiner $230_1$-$230_6$ (six in total, assuming each of the three of more switch matrices has six output ports) having one input coupled to a different one of the three or more switch matrices.

In a particular embodiment of the invention, each of the switch matrices $210_1$ and $210_2$ includes a signal mute function operable to apply an off state or null output signal to one or more of the switch matrix output ports. The off state or null output signal may be defined as a signal which does not exceed a predefined signal level. For example, the null output signal may be a signal substantially at ground potential, or it may be defined as a signal having an amplitude which is below that of a predefined detection level (e.g., a signal level more than 10 dB below a reference level known to correspond to a received valid or "on" signal). Further exemplary, the null output signal may have a predefined level around (i.e., above or below) the signal ground (e.g., a predefined DC offset level), or the null signal may be a zero differential signal. Control signals (not shown) are supplied to one or both of the switch matrices $210_1$ and $210_2$ for controlling said one or both of the switch matrices $210_1$ and $210_2$ to apply a null output signal to all, except one of the switch matrix outputs coupled to one combiner (a null output signal applied to one combiner input in the illustrated embodiment), such that only the desired signal is provided to each of the combiners $230_1$-$230_6$. Alternatively, the signal muting function may be located separately, e.g., coupled between the switch matrices 210 and the combiners 230, or located within the combiners 230 themselves. Exemplary embodiments of a switch matrix 210 employing a signal muting function are shown and described in connection with FIGS. 2C and 2D below.

The desired signal is applied to one of the inputs of each of the combiners $230_1$-$230_6$, the combiners each operable to pass said desired signal to a downconverter circuit 240, embodiments of which are further described below. Each downconverter circuit 240 downconverts the supplied signal, for example, a received Ku or Ka band signal is downconverted to an L-band signal, and supplies the downconverted signal to a respective combiner $270_1$-$270_3$. Each combiner $270_1$-$270_3$ combines two downconverted signal portions (e.g., lower and higher L-band signals 950-1450 MHz and 1650-2150 MHz) to produce a composite signal, the composite signal supplied to one or more receivers (fixed frequency or tunable, not shown) by either wired (e.g., coaxial/fiber cable) or wireless means (e.g., radio frequency, optical, infrared signals).

Due to the architecture of the present invention, post-conversion filtering in a particular embodiment is not needed, as the downconversion architecture results in very little signal power residing outside of the intended frequency range of the signals supplied to the combiner circuits $270_1$-$270_3$. The architecture provides a relatively large frequency separation of LO and RF frequency from the output IF frequency, resulting in large separation of the undesired mixer images/unwanted sidebands from the desired IF. For instance, at Ku band the signal is around 12 GHz and the LO around 14 GHz, producing the desired IF at the difference frequency of about 2 GHz at L-band, while the undesired sideband falling to the sum frequency is around 26 GHz, far away from the desired L-band. At this high frequency, the undesired signal will typically naturally decay due to inherent high frequency roll-off properties of most elements in the system, including the receiver, and as such typically does not need much filtering for separation and removal from the desired signal. In one exemplary application in which the input signals are Ku/Ka band signals and the downconverter circuits $240_1$-$240_6$ are operable to downconvert the Ku/Ka band signals to upper and lower L-band signals of 1650-2150 MHz (signals "H") and 950-1450 MHz (signals "L"), respectively, very little signal power resides in the 950-1450 MHz range for the upper band signals "H" supplied to the combiners $270_1$-$270_3$, and similarly very little signal power resides in the 1650-2150 MHz frequency range for the lower band signals "L" supplied to combiners $270_1$-$270_3$.

Optionally, however, filters $250_1$-$250_6$ (e.g., high pass, low pass, bandpass, bandstop, etc., as appropriate) may be provided in order to provide additional rejection of noise, interference, or adjacent channel signals. In a particular embodiment, downconverter circuits $240_1$, $240_3$ and $240_5$ each are operable to provide a first frequency signal (e.g., lower L-band signals 950-1450 MHz), and downconverter circuits $240_2$, $240_4$, and $240_6$ are each operable to provide a second frequency signal (e.g., higher L-band signals 1650-2150 MHz). In such an embodiment, corresponding filters $250_1$, $250_3$, and $250_5$ are operable to provide attenuation to the second frequency signals (e.g., the upper L-band signals), and filters $250_2$, $250_4$, and $250_6$ are operable to provide signal attenuation to the first frequency signals (e.g., the lower L-band signals). Filters $250_1$ $250_6$ may be coupled between the downconverter circuits $240_1$-$240_6$ and the combiners $270_1$-$270_3$ as shown, or alternatively, incorporated within each of the combiners $270_1$-$270_3$, or further alternatively, implemented in a combination of these locations.

Figure 2B:
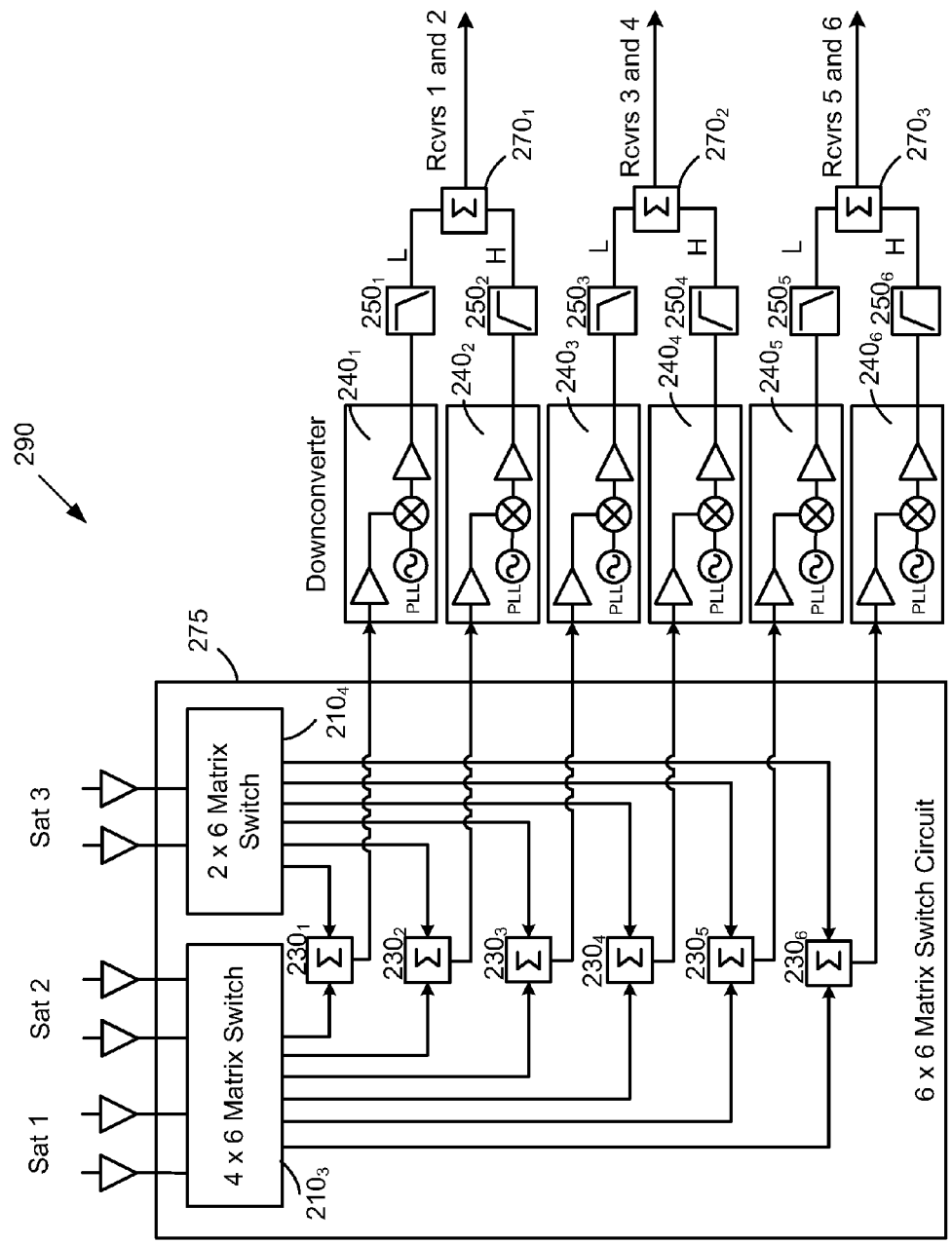
FIG. 2B illustrates a second exemplary embodiment of a switch matrix circuit in accordance with the present invention.

FIG. 2B illustrates a second exemplary switch matrix circuit 275 in accordance with the present invention, with previously-identified features retaining their reference indicia. The signal distribution system 290 includes many of the same components as the system 200 illustrated in FIG. 2A, including combiners $230_1$-$230_6$, downconverter circuits $240_1$-$240_6$, optional filters $250_1$-$250_6$, and combiners $270_1$-$270_3$. In distinction, system 290 includes a first switch matrix $210_3$ having four inputs, thereby allowing a total of six input signals (e.g., for receiving two orthogonal signals for each of three satellite sources, as shown). Particularly, the 4×6 and 2×6 switches are combined to form an equivalent 6×6 matrix switch 275.

Figure 1:
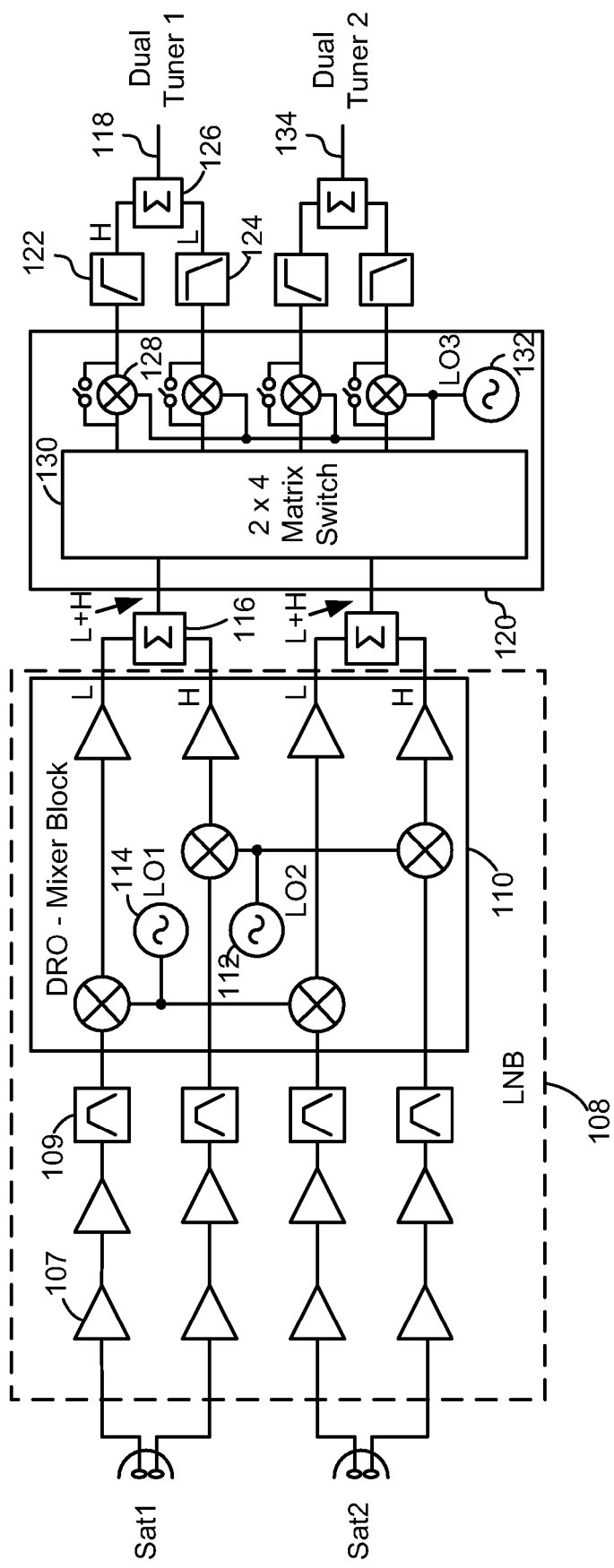
FIG. 1 illustrates a conventional system operable to distribute satellite television signals.

From FIGS. 2A and 2B, it can be seen that first and second switch matrices may either having the same number of input ports, e.g., switch matrices $210_1$ and $210_2$ each having two input ports, or they may include a different number of input ports, e.g., switch matrix $210_3$ having four input ports, and switch matrix $210_4$ having two input ports. It can be further observed that the function and construction of second switch matrix $230_4$ is similar to switch matrix $210_2$ as shown in FIG. 2A above. The first switch matrix $230_3$ will comprise a different internal switching architecture compared with its counterpart 2×6 switch matrix $210_1$ shown in FIG. 1, although those skilled in the art will readily appreciate that such modifications can be easily accomplished.

Figure 2C:
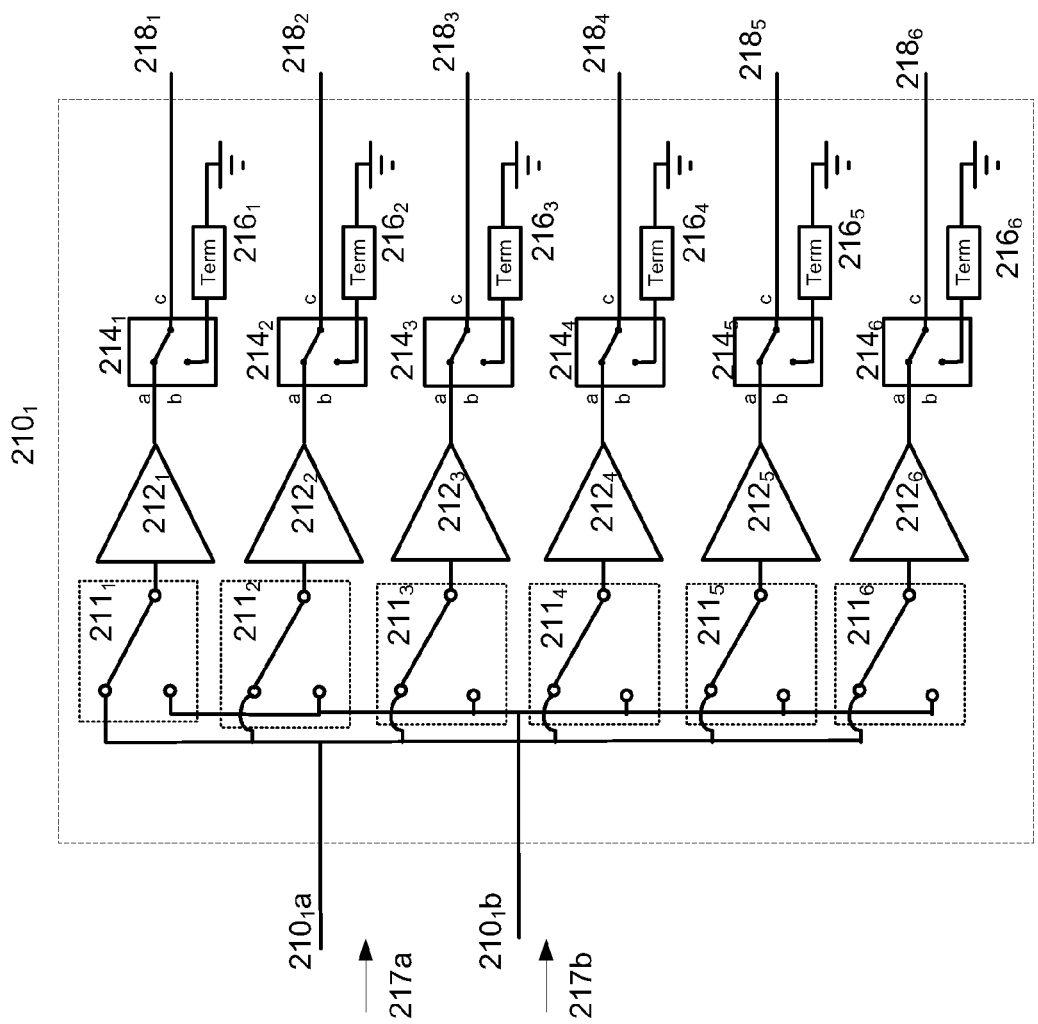
FIG. 2C illustrates a first exemplary embodiment of an exemplary switch matrix employing a signal muting function in accordance with one embodiment of the present invention.

FIG. 2C illustrates a first exemplary embodiment of an exemplary switch matrix $210_1$ employing a signal muting function in accordance with one embodiment of the present invention. In a specific embodiment of the invention, switch matrices $210_1$ and $210_2$ are identically constructed, although their construction may differ in alternative embodiments under the invention.

In the exemplary embodiment illustrated, the switch matrix 210 includes six (6) single-pole double-throw (1P2T) switches $211_1$-$211_6$, optional buffer amplifiers $212_1$-$212_6$, six (6) single-pole, double-throw (1P2T) switches $214_1$-$214_6$, and a respective plurality of terminations $216_1$-$216_6$. Power and control signals are supplied to each of the illustrated component, although these features are not shown to facilitate illustration.

The switch matrix $210_1$ includes a first input $210_1a$ coupled to receive a first input signal $217a$, and a second input $210_1b$ coupled to receive a second input signal $217b$. In the particular embodiment show in FIG. 2A, the first and second input signals $213a$ and $213b$ are signals (e.g., orthogonal signals) associated with the same source (SAT1). The switch matrix may include additional signal inputs for receiving additional signals from another source, for example the embodiment of FIG. 2B in which the switch matrix $210_1$ is constructed with four inputs operable to receiver two orthogonal signals from each of two signal sources (SAT1 and SAT2).

The switch matrix $210_1$ further includes six outputs $218_1$-$218_6$, each coupled to an input of respective switches $211_1$-$211_6$. Collectively, switches $211_1$-$211_6$ are operable to couple any of signals $217a$ and $217b$ to any one or more of the inputs to switches $214_1$-$214_6$. For example, switches $211_1$-$211_6$ is made operable to provide signal $217a$ to each of the switches $214_1$-$214_6$ when a control signal (not shown) of a first type is supplied thereto, and operable to provide signal $217b$ to each of the switches $214_1$-$214_6$ when the control signal is of a second type. Optionally, one or more buffer amplifiers $212_1$-$212_6$ are employed to provide signal gain and buffering between switches $211_1$-$211_6$ and the switches $214_1$-$214_6$.

In a particular embodiment, control of the six 1P2T switches $211_1$-$211_6$ (via control signal(s), not shown) are synchronized such that all of the switches $211_1$-$211_6$ are switched to couple to either input $210_1a$, or input $210_1b$. In this manner, any one of the input signals $217a$ or $217b$ may be switchably coupled to outputs $218_1$-$218_6$.

Each of switches $214_1$-$214_6$ includes a first input $214a$, a second input $214b$, and an output $214c$. Each of switches $214_1$-$214_6$ is operable to selectively switch (responsive to a control signal, not shown) its input pole to either the first input $214a$ to receive an output signal from its respective switch $211$, or to the second input $211b$ to couple to a load $216$. When couple to the first input $214a$, the switch $214_1$ provides the signal supplied by switch $211_1$ (either signal $210_1a$ or signal $210_1b$, depending upon the state of switch $211_1$) to its output $214c$. When coupled to the second input $214b$, switch $214_1$ provides a null output signal to its output $214c$, as well as presenting the impedance of termination $216_1$ to the input of the next stage component. The impedance of termination $216_1$ may be chosen as any value (e.g., a short circuit, an open circuit, a 50 ohm load, or any impedance value, as well as a capacitive or inductive load, and realized in either lumped element or distributed form), and in one embodiment is selected so as to provide an optimal impedance match to the subsequent component to minimizing the generation of transients which could interfere with/degrade signals supplied on the other outputs $218$. Each of switches $214_2$-$214_6$ operates in a similar manner.

While switches $211_1$-$211_6$ operate collectively as a 6P2T switch, and each of switches $214_1$-$214_6$ are implemented as 1P2T switches, other switch types may be implemented to route a larger or smaller number of signals. Furthermore, all or portions of the switch matrix $210_1$ may be constructed in either differential signal or single-ended form, and monolithically fabricated with corresponding switch matrix $210_2$, or at a higher level of integration.

Figure 2D:
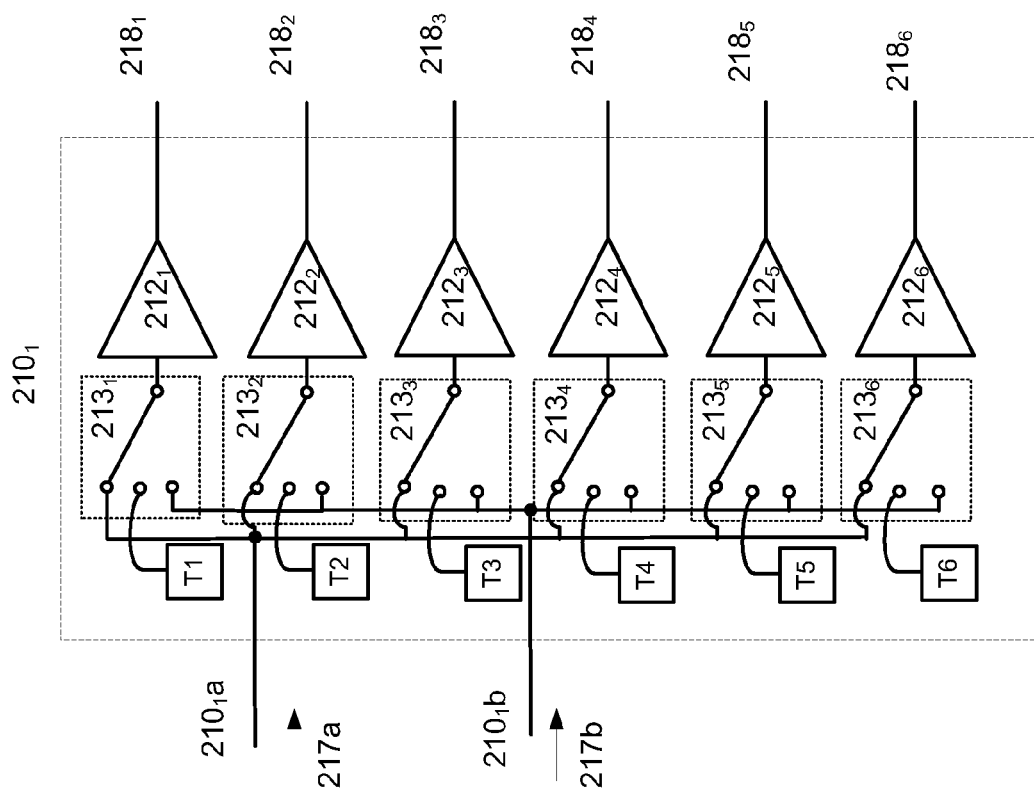
FIG. 2D illustrates a second exemplary embodiment of an exemplary switch matrix employing a signal muting function in accordance with one embodiment of the present invention.

FIG. 2D illustrates a second exemplary switch matrix $210$ employing a signal muting function in accordance with one embodiment of the present invention. As noted above, switch matrices $210_1$ and $210_2$ may be identically constructed, although in other embodiments, their construction may differ.

In the exemplary embodiment of FIG. 2D, six (6) single-pole triple-throw (1P3T) switches $213_1$-$213_6$ are employed, each operable to switch between three connections, signal input $210_1a$, signal input $210_1b$, or a respective termination T1-T6. Each of the terminations T1-T6 may be of any value (short circuit, 50 ohms, open circuit, capacitive or inductive load) and in a particular embodiment is selected to provide an impedance which provides an optimal match to the switch. Terminations T1-T3 are shown as individual components, although a common termination may be alternatively employed and coupled to each of the switches $213_1$-$213_6$. For example, depending on the type of the amplifiers and source impedances driving input lines $210_1a$ and $210_1b$, the six terminations could be collapsed into one common termination coupled to each pole of switches $213_1$-$213_6$.

In a particular embodiment, control of the six 1P3T switches $213_1$-$213_6$ (via control signal(s), not shown) are provided such that the any of the output ports $218_1$-$218_6$ may be coupled to any one of the input ports $210_1a$ or $210_1b$, or to a respective termination T1-T6.

The exemplary switch matrix $210$ further includes one or more buffer amplifiers $212_1$-$212_6$ operable to provide signal gain and buffering between switches $213_1$-$213_6$ and output ports $218_1$-$218_6$. In comparison with the exemplary embodiment of FIG. 2C, switches $214_1$-$214_6$ along with terminations $216_1$-$216_6$ are omitted as unnecessary. Implementation of the 3P1T switches $213_1$-$213_6$ and the terminations T1-T6 obviates the need for the second switches $214_1$-$214_6$ and terminations $216_1$-$216_6$.

FIG. 2E illustrates a method for constructing a switch matrix circuit in accordance with the present invention. Initially at $282$, a plurality of switch matrices is provided (e.g., $210_1$ and $210_2$), each of the plurality of the switch matrices (e.g., $210_1$) having one or more input ports ($210_1a$, $210_1b$) for receiving a respective one or more input signals (e.g., $217a$, $217b$), and a plurality of N outputs (e.g., $218_1$-$218_6$) switchably coupled to any one or more of the inputs. It will be understood that multiple matrices may be coupled together to form one matrix having the aforementioned plurality of N outputs; for example two 2×3 switch matrices may be coupled together to form the 2×6 matrix of $210_1$ illustrated in FIG. 2A. In such an instance, the collectively number of outputs is six, and each of the outputs is switchably coupled to any one or more of those inputs. Accordingly, such an arrangement is included within the scope of the present description and invention.

Next at $284$, a plurality of N signal combiners are provided, each of the N signal combiners including a plurality of input ports and one output port, each signal combiner having at least a first input port coupled to one of the N outputs from a first of the plurality of switch matrices, and at least a second input port coupled to one of the N outputs from a second of the plurality of switch matrices.

Exemplary embodiments of systems constructed by such a method are illustrated in FIGS. 2A and 2B. In the embodiment $205$ of FIG. 2A, two 2×6 switch matrices $210_1$ and $210_2$ are provided, each having two signal input ports and a total of six output ports switchably coupled to each of the two input ports. Six signal combiners $230_1$-$230_6$ each include a first input coupled to one of the six outputs of the first matrix $210_1$, and a second input coupled to one of the six outputs of the second switch matrix $210_2$. The embodiment $275$ of FIG. 2B also employs two switch matrices, a 4×6 switch matrix $210_3$, and a 2×6 switch matrix $210_4$. Each of the four inputs of the 4×6 matrix are switchably coupled to any one or more of its six outputs (either by means of a single 4×6 switch matrix structure, or by multiple switch matrices coupled together), and each of the two inputs of the 2×6 matrix are switchable coupled to any one or more of its outputs. Six signal combiners $230_1$-$230_6$ are also employed, each having a first input coupled to one output of the 4×6 switch matrix, and a second input coupled to one output of the 2×6 switch matrix. From the foregoing, it will be appreciated that the number of switch matrices (each providing an N number of outputs, as described above) may vary. An exemplary number of switch matrices included within the present method include two, three, four, five, six, seven, eight, nine, 10, 12, 14, 16, 20, 50, 100 or more switch matrices. Further, the number of input ports per switch matrix may vary. The number of inputs for each switch matrix, which may be different for different switch matrices, may be one, three, four, five, six, seven, eight, nine, 10, 12, 14, 16, 20, 50, 100 or more ports. The number of output ports for each of the plurality of switch matrices will be N, as described above, and may include three, four, five, six, seven, eight, nine, 10, 12, 14, 16, 20, 50, 100 or more ports.

Operation 282 may be performed by fabricating the plurality of switch matrix circuits either as discrete circuits or within an integrated circuit using a photolithographic processing technique. In another embodiment, the operation is performed by providing equivalent functionality of the switch matrices within a software or logical environment, or by firmware. Those skilled in the art will appreciate these and other means may be used to carry out this operation.

Operation 284 may be performed in the manners mentioned above, e.g., either as circuitry disposed in discrete or integrated circuit form or logically in a software or firmware environment. Particular embodiments of the signal combiners are illustrated in FIGS. 2A and 2B, although those skilled in the art will appreciate that variations may be made. For example in a method for constructing a three matrix system, each of the signal combiners will include three inputs, one input for coupling to one output from each of the three switch matrices.

FIG. 3A illustrates an exemplary frequency translation and signal distribution system 300 in accordance with an embodiment of the present invention. The system 300 includes a first switch matrix $310_1$, a second switch matrix $310_2$, six downconverter circuits $340_1$-$340_6$, three signal combiners $370_1$-$370_3$, and optional filters $350_1$-$350_6$. Each of the first and second switch matrices $310_1$ and $310_2$ includes two inputs for receiving a respective two signals, e.g. orthogonal signals from one satellite. Each of the first and second switch matrices $310_1$ and $310_2$ further include a plurality of outputs (six shown), each switch matrix operable to route the signal(s) it receives to any one or more of its respective outputs. As those skilled in the art will appreciate, each of the first and second switch matrices may be alternatively configured to have a different number of inputs (e.g., one, three, four, five, six, eight, 10, 12, 16, 20, 50, 100 or more) as well as a different number of output ports (two, three, four, five, six, eight, 10, 12, 16, 20, 50, 100 or more). Power and control signals (not shown in order to simplify the drawing) are routed to each of the components to activate and control the operating states of such components to perform the operations as described herein.

The downconverter circuits $340_1$-$340_6$ each include a first input 340a coupled to receive the first input signal (which is switchably output by the first switch matrix $310_1$), a second input 340b coupled to receive the second input signal (which is switchably output by the second switch matrix $310_2$), and an output 340c for providing a downconverted output signal.

The exemplary downconverter circuits $340_1$-$340_6$ are each operable to select between the first and second input signal as its input signal, and to provide a corresponding downconverted signal in one of two different frequency-translated versions, e.g., a lower L-band signal (designated "L") and a higher L-band signal (designated "H"). Of course, the downconverter may be configured to provide a larger number of possible frequency translations as well. An exemplary embodiment of the downconverter circuit 340 is shown in greater detail in FIG. 3B. Alternatively, the downconverter circuits 740 or 840 illustrated in FIGS. 7B and 8B, respectively, may be alternatively employed in accordance with the invention.

The system 300 further includes three signal combiners $370_1$-$370_3$, each combiner including a first input 370a for receiving a first (e.g., lower band) downconverted signal, a second input 370b for receiving a second (e.g., high band) downconverted signal, and an output for providing a composite signal containing both downconverted signal portions. Each composite signal may then be provided to a receiver (agile or fixed tuner), in the illustrated embodiment two receivers, although a different number of receivers may be supplied in alternative embodiments. Optionally, filters $350_1$-$350_6$ (which may be high pass, low pass, bandpass, bandstop, etc.) may be employed to provide additional rejection of adjacently located undesired signals. One or both of the first and second switch matrices $310_1$ and/or $310_2$ may be constructed using a combination of sub-matrices, as shown in FIGS. 2A and 2B.

FIG. 3B illustrates an exemplary embodiment of the downconverter circuits $340_1$-$340_6$ in accordance with an embodiment of the present invention. The downconverter circuit 340 includes first and second inputs 340a, 340b coupled to receive respective first and second input signals, and an output 340c for providing a downconverted output signal. The downconverter 340 further includes a mixer circuit 342, and first and second switches 343 and 344. The mixer circuit 342 includes a first input 342a coupled to a reference frequency source 341 (exemplary shown within the downconverter circuit, although it may be externally located in an alternative embodiment), a second input 342b, and an output 342c coupled to the downconverter circuit output 340c. The first switch 343 includes a first port coupled to the downconverter circuit first input 340a and a second port switchably coupled to the mixer circuit second input 342b. The second switch 344 includes a first port coupled to the downconverter circuit second input 340b, and a second port switchably coupled to the mixer circuit second input 342b.

In a specific embodiment of the system 300, the matrix switches $310_1$ and $310_2$ operate at the frequency of the input signal, i.e. at the "radio frequency" RF, which in satellite applications is typically at Ku band (~12 GHz) or Ka band (~18 GHz). The frequency range or bandwidth is typically 500 MHz wide. The input signals have different polarizations, which can be circular (right hand circular polarization RHCP and left hand circular polarization LHCP) or linear (horizontal H and vertical V). Each matrix switch $310_1$ and $310_2$ is operable to route any of its inputs to any of its outputs. The matrix switches $310_1$ and $310_2$ may have a state with any or all of the outputs "RF muted", i.e. RF output(s) turned off as described above.

Each of the downconverter circuits $340_1$-$340_6$ can be integrated in an IC. Each downconverter circuit $340_1$-$340_6$ includes two inputs, one of which is routed at a time to the mixer via the built-in switches. If the matrix switches provide an RF mute function, the downconverter switches 343 and 344 may be omitted. In this case, the input downconverter signals can be simply combined, with one muted while the other is active, and vice versa. The local oscillator 341 for the downconverter mixer is provided by a phase lock loop (PLL) synthesizer, enabling the downconverter 340 to tune to the desired frequency. The output of the downconverter is at the standard satellite intermediate (IF) frequency at L-band from 950 MHz to 2150 MHz. The outputs of individual downconverters 340 are filtered and combined in pairs. Within each pair, one selected input signal is downconverted to the low band L (950-1450 MHz) and is low low-pass filtered, while another selected input signal is downconverted to the high band H (1650-2150 MHz) and is high-passed in prior to combining. Since the two signals do not overlap in frequency, the two filters can be designed as diplexers, i.e. the combiners 370$_1$-370$_3$ can be a direct wire connection. The combined signal is often referred to as the "band-stacked" signal. It entirely falls within the IF band from 950 to 2150 MHz and can be conveniently carried on a single coaxial cable and received by two independently tuned receivers. Both receivers can receive any of the input signals, one receiver tuned in the low band L and the other in the high band H.

Figure 4:
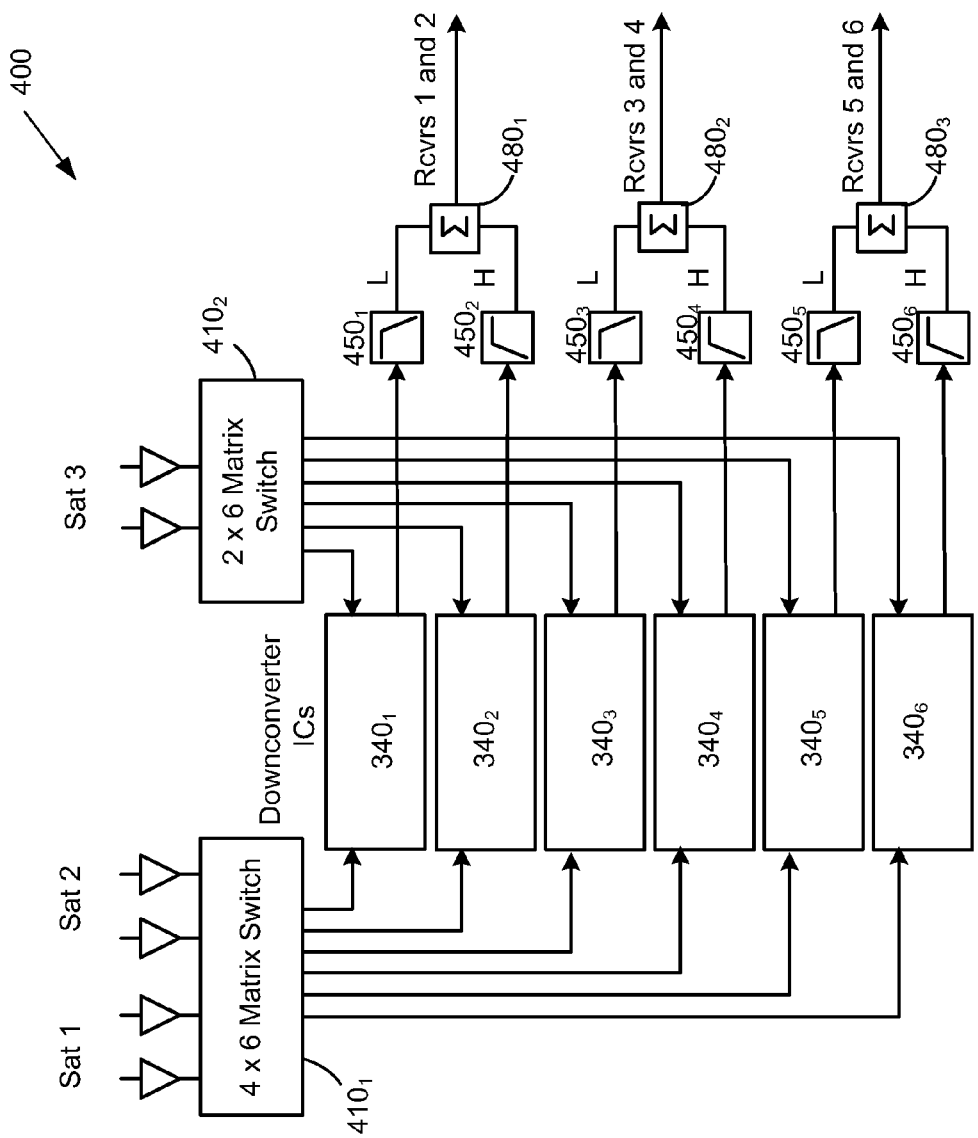
FIG. 4 illustrates a further exemplary embodiment of a frequency translation and signal distribution system in accordance with an embodiment of the present invention.

FIG. 4 illustrates a further exemplary embodiment of a frequency translation and signal distribution system in accordance with an embodiment of the present invention. The system 400 is similarly arranged to the system 300, albeit expanded to permit reception of three input signal sets (e.g., two orthogonal signals from each of three satellites). Power and control signals (not shown in order to simplify the drawing) are routed to each of the components to activate and control the operating states of such components to perform the operations as described herein.

The system includes a first switch matrix 410$_1$ configured as a 4×6 switch matrix, a second switch matrix 410$_2$ configured as a 2×6 matrix. The system further includes six downconverter circuits 340$_1$-340$_6$, six optional filters 450$_1$-450$_6$, and three signal combiners 480$_1$-480$_3$. Those skilled in the art will appreciate that the system may be further expanded to accommodate additional input signal sets. While the downconverter circuits employ the circuitry of downconverter 340, the downconverter circuits 740 or 840 illustrated in FIGS. 7B and 8B, respectively, may be alternatively employed as downconverter circuits in system 400 in accordance with the invention.

Figure 5:
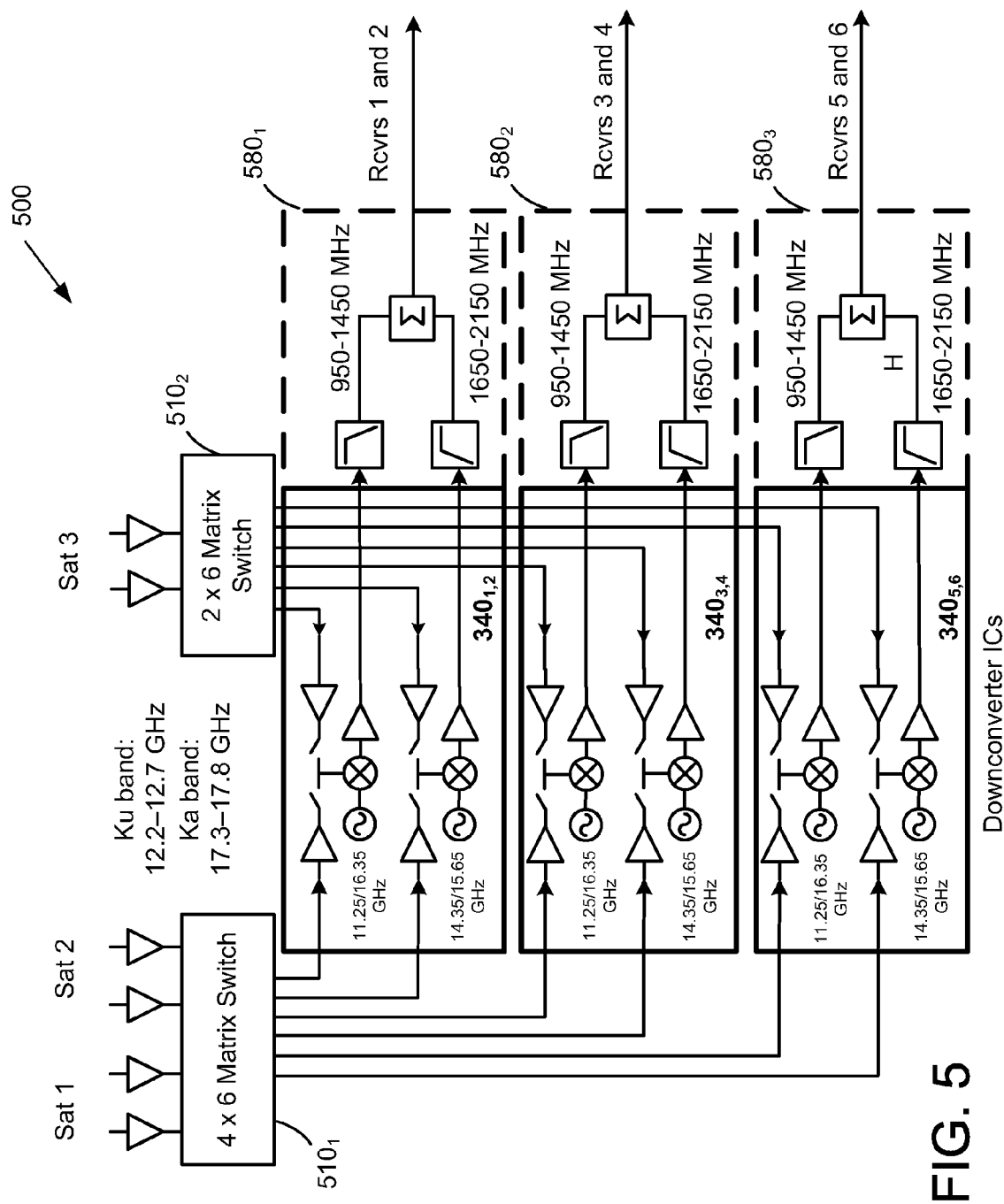
FIG. 5 illustrates a further exemplary embodiment of a frequency translation and signal distribution system in accordance with an embodiment of the present invention.

FIG. 5 illustrates a further exemplary embodiment of a frequency translation and signal distribution system in accordance with an embodiment of the present invention. The system 500 includes a first switch matrix 510$_1$ configured as a 4×6 matrix for receiving two orthogonal signals from each of two satellite sources, and a second switch matrix 510$_2$ configured as a 2×6 matrix for receiving signals from a third satellite. The downconverter circuits are implemented as dual downconverter circuits 340$_{1,2}$, 340$_{3,4}$, and 340$_{5,6}$, each of which is operable to process both Ku and Ka band signals. The LO frequencies are shown for processing the exemplary Ku and Ka band frequency ranges of 12.2-12.7 GHz and 17.3-17.8 GHz, respectively. While the dual downconverter circuits employ the circuitry of downconverter 340, the downconverter circuits 740 or 840 illustrated in FIGS. 7B and 8B, respectively, may be alternatively employed as dual downconverter circuits in system 500 in accordance with the invention. Power and control signals (not shown in order to simplify the drawing) are routed to each of the components to activate and control the operating states of such components to perform the operations as described herein.

The system 500 further includes filter/diplexer circuits 580$_1$, 580$_2$, 580$_3$ which combines the filtering and signal combiner functions as shown. Each of the dual downconverter circuits 340$_{1,2}$, 340$_{3,4}$, and 340$_{5,6}$ may be monolithically fabricated within an integrated circuit, and the associated filter/diplexer circuit formed as a part thereof, or provided externally thereto.

Figure 6:
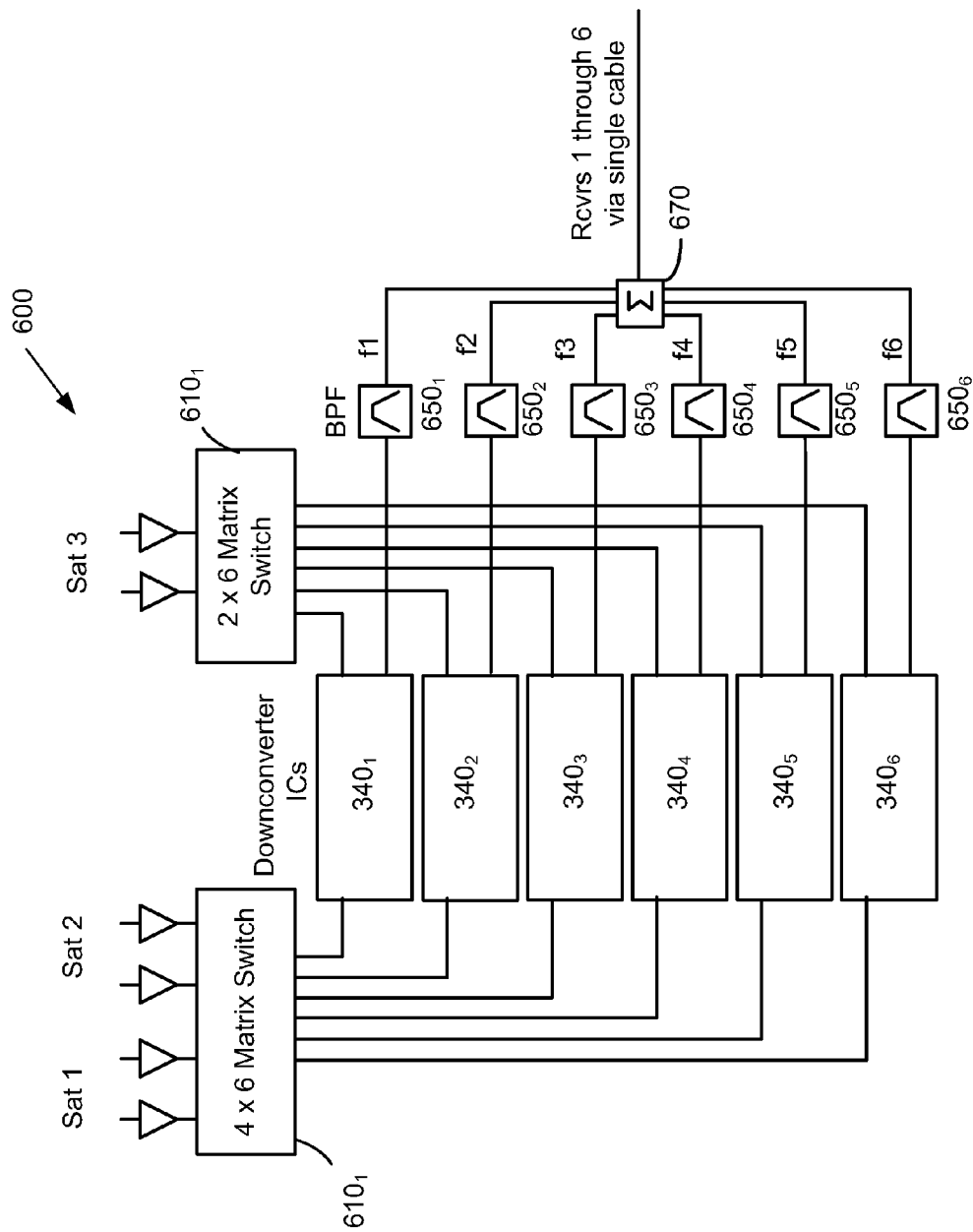
FIG. 6 illustrates a further exemplary embodiment of a frequency translation and signal distribution system in accordance with an embodiment of the present invention.

FIG. 6 illustrates a further exemplary embodiment of a frequency translation and signal distribution system in accordance with an embodiment of the present invention. The system 600 includes a first switch matrix 610$_1$ configured as a 4×6 matrix for receiving two orthogonal signals from each of two satellite sources, and a second switch matrix 610$_2$ configured as a 2×6 matrix for receiving signals from a third satellite. Power and control signals (not shown in order to simplify the drawing) are routed to each of the components to activate and control the operating states of such components to perform the operations as described.

Downconverter circuits 340$_{1-6}$ provide each of six different frequency-translated signals. Optional band-pass filters 650$_1$-650$_6$ are tuned to different carrier frequencies which are subsequently combined using combiner 670 to form a single composite signal. The combined signal is referred to as the "channel-stacked" signal. In this configuration, six different receivers can have simultaneous and independent reception of any of the input satellite signals via a single coaxial cable.

FIG. 7A illustrates an exemplary frequency translation and signal distribution system 700 in accordance with an embodiment of the present invention. The system 700 includes a first switch matrix 710$_1$, a second switch matrix 710$_2$, circuitry 720 for supplying external signals, six downconverter circuits 740$_1$-740$_6$, three signal combiners 770$_1$-770$_3$, and optional filters 750$_1$-750$_6$. Power and control signals (not shown in order to simplify the drawing) are routed to each of the components to activate and control the operating states of such components to perform the operations as described herein.

The first switch matrix 710$_1$ includes two inputs for receiving a respective two signals, e.g. orthogonal signals from one satellite, and the second switch matrix 710$_2$ includes four inputs for receiving a respective four signals, e.g., two orthogonal signals from each of two satellites. Each of the first and second switch matrices 710$_1$ and 710$_2$ further include a plurality of outputs (six shown), each switch matrix operable to route the signal(s) it receives to any one or more of its respective outputs. As those skilled in the art will appreciate, each of the first and second switch matrices may be alternatively configured to have a different number of inputs (e.g., one, two, three, four, five, six, eight, 10, 12, 16, 20, 50, 100 or more) as well as a different number of output ports (two, three, four, five, six, eight, 10, 12, 16, 20, 50, 100 or more).

The signal supply circuitry 720 is operable to multiplex an external signal (e.g., a downconverted signal supplied from an externally-located LNB) into the system 700. In one embodiment, the externally-supplied signal 721 includes multiple signal components (e.g., two or more channels, or bands of channels, or a combination of both), illustrated as L+H indicating an exemplary input signal having lower and higher frequency band content. In an alternative embodiment, three of more frequency components may be included in the externally-supplied signal 721. Exemplary circuitry 720 includes respective low and high pass filters 722$a$ and 722$b$ for recovering the low and high frequency components of the supplied signal 721, a frequency converter 725 for translating the low and high frequency components either to substantially the same frequency or to its high/low frequency counter-part (e.g., an lower band "L" frequency signal translated to a higher band "H" frequency signal, or visa versa), low pass filters 726 operable to block injection of the high frequency Ku/Ka band signals 729 into the frequency converter 725, and high pass filters 727, operable to block low the downconverted (e.g., L-band) signals exiting the frequency converter 725 from injection into Ku/Ka band amplifiers 728. The first frequency signal output from the frequency converter 725 (e.g., an L-band signal) and the second frequency signal output from amplifiers 728 (e.g., a Ku/Ka-band signal) are combined to form a frequency-multiplexed signal, which is supplied to signal matrix $710_1$, as shown in FIG. 7A.

The downconverter circuits $740_1$-$740_6$ each include a first input 740a coupled to receive the first input signal (which is switchably output by the first switch matrix $710_1$), a second input 740b coupled to receive the second input signal (which is switchably output by the second switch matrix $710_2$), and an output 740c for providing a downconverted output signal. The exemplary downconverter circuits $740_1$-$740_6$ are each operable to select between the first and second input signals as its input signal, and to provide a corresponding downconverted signal in one of two different frequency-translated versions, e.g., a lower L-band signal (designated "L") and a higher L-band signal (designated "H"). Of course, the downconverter may be configured to provide a larger number of possible frequency translations as well. An exemplary embodiment of the downconverter circuit 740 is shown in greater detail in FIG. 7B. Alternatively, the downconverter circuits 340 or 840 illustrated in FIGS. 3B and 8B, respectively, may be alternatively employed in accordance with the invention.

The system 700 further includes three signal combiners $770_1$-$770_3$, each combiner including a first input for receiving a first (e.g., lower band "L") downconverted signal, a second input for receiving a second (e.g., high band "H") downconverted signal, and an output for providing a composite signal containing both downconverted signal portions. Each composite signal may then be provided to a receiver (agile or fixed tuner), in the illustrated embodiment two receivers, although a different number of receivers may be supplied in alternative embodiments. Optionally, filters $750_1$-$750_6$ (which may be high pass, low pass, bandpass, bandstop, etc.) may be employed to provide additional rejection of adjacently located undesired signals.

In a exemplary application, system 700 is operable as a satellite frequency translation system for receiving input from three satellites with additional capability of receiving and processing an external input signal 721 which originates from another satellite via a low noise block converter (LNB). External signal 721 is already downconverted and band-stacked at L-band in the LNB. External signal 721 is first "band de-stacked" or split by the means of diplexing filters 722a and 722b into low band L (950-1450 MHz) and high band H (1650-2150 MHz) signals. The frequency converter 725 converts the two bands into their respective "complementary" bands by the means of a 3.1 GHz local oscillator (LO). This LO frequency converts or makes a copy of the low band into high band (L into $H_L$) and the high band into low band (H into $L_H$). A total of 4 outputs are provided: L, H, $H_L$ and $L_H$. Each output is combined by the means of combiners/diplexers 726 and 727 with one of the Ku or Ka band satellite signals, forming composite Ku/Ka+L-band signals. Filters 726 and 727 can be realized as a diplexer as shown in the figure, or can be a simple power combiner. The four composite signals are selected/routed by the matrix switch $710_1$ and fed to downconverters $740_1$-$740_6$. Each downconverter $740_1$-$740_6$ either downconverts the Ku/Ka band to L-band, or routes the input L-band signal directly to the output 740c, depending on which signal source is desired, i.e. selected. In this manner, the same matrix switch $710_1$ is used for routing both the Ku/Ka and L-band signals.

FIG. 7B illustrates an exemplary embodiment of the downconverter circuits $740_1$-$740_6$ in accordance with an embodiment of the present invention. The exemplary downconverter circuit 740 is constructed similarly to the downconverter circuit 340 shown in FIG. 3B (previously-described features retaining their reference numerals), the downconverter circuit 740 of FIG. 7B having a (third) switch 746 having a first port coupled to the mixer circuit output 342c, and a second port switchably coupled to the downconverter circuit output 740c. Further included in the downconverter circuit 740 is a (fourth) switch 747 having a first port coupled to the downconverter circuit first input 740a, and a second port switchably coupled to the downconverter circuit output 340c.

The first, second, third and fourth switches 343, 344, 746 and 747 operate in the following manner to provide a downconverted signal output to the output port 740c. In a first condition, one of the non-downconverted signals 729 is supplied to the downconverter circuit first input port 740a, downconverted, and supplied to the output port 740c. In this condition, first and third switches 343 and 746 are controlled to a closed state, and the second and fourth switches 344 and 747 are controlled to an open state. The second buffer amplifier 345b may be deactivated in this condition to increase signal isolation and reduce power consumption.

In a second condition, one of non-downconverted signals supplied to the second switch matrix $710_2$ is supplied to the downconverter circuit second input port 740b, downconverted, and supplied to the output port 740c. In this condition, second and third switches 344 and 746 are controlled to a closed state, and the first and fourth switches 343 and 747 are controlled to an open state. The first buffer amplifiers 345a may be deactivated in this condition to increase signal isolation and reduce power consumption.

In a third condition, one of the frequency portions (e.g., the "H" or "L" band signals) of the pre-downconverted signal 721 is supplied to the first input port 740a, and supplied directly to the output port 740c. In this condition, the first, second, and third switches 343, 344, and 746, are controlled to an open state, and the fourth switch 747 is controlled to a closed state. The oscillator 341, mixer 342, and buffer amplifiers 345a-345c may be deactivated in this condition to increase signal isolation and reduce power consumption.

Figures 8A, 8B:
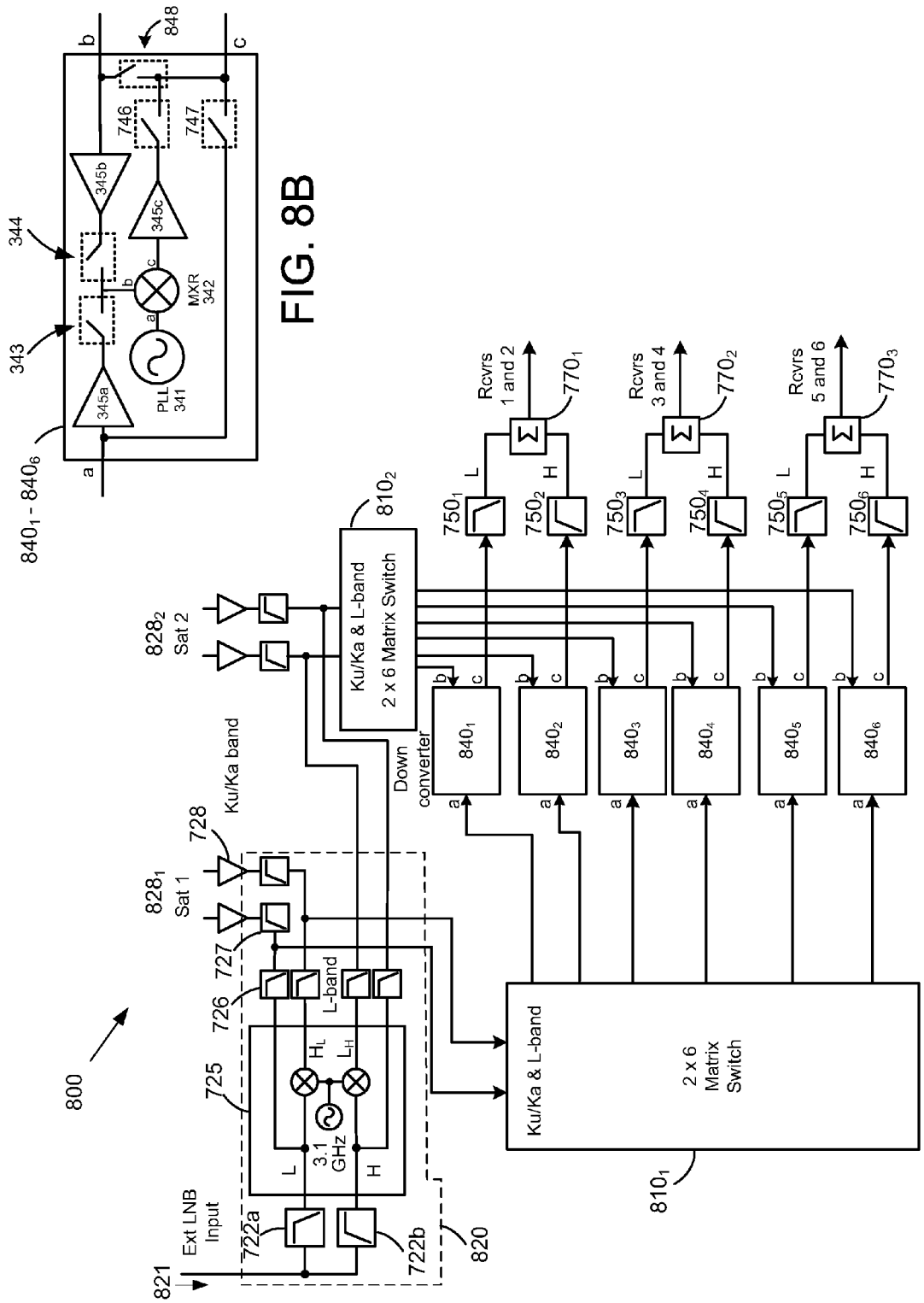
FIGS. 8A and 8B illustrate an exemplary embodiment of a frequency translation and signal distribution system, and corresponding downconverter circuit, respectively, in accordance with an embodiment of the present invention.

FIG. 8A illustrates an exemplary frequency translation and signal distribution system 800 in accordance with an embodiment of the present invention. The system 800 is arranged similarly to that of system 700 in FIG. 7A, system 800 configured with first and second switch matrices $810_1$ and $810_2$ which are operable at both the pre-downconverted frequency range of the externally supplied signal 821 (e.g., L-band frequency range) and at a second frequency range for the non-downconverted signals $828_1$ and $828_2$ (e.g., Ku/Ka frequency band). The signal supply circuitry 820 is arranged similarly to that of signal supply circuitry 720, with circuitry 820 omitting two of the four high pass filters 727 in distinction. System 800 employs six downconverter circuits $840_1$-$840_6$, three signal combiners $870_1$-$770_3$, and optional filters $850_1$-$850_6$ in a system level configuration similar to that of system 700, with operation and control of the previously defined components are as described above.

FIG. 8B illustrates an exemplary embodiment of the downconverter circuits $840_1$-$840_6$ in accordance with an embodiment of the present invention. The exemplary downconverter circuit 840 is constructed similarly to the downconverter circuit 740 shown in FIG. 7B (previously-described features retaining their reference numerals), the downconverter circuit 840 of FIG. 8B including a (fifth) switch 848 having a first port coupled to the downconverter circuit second input 840*b*, and a second port switchably coupled to the downconverter circuit output 840*c*.

The first, second, third, fourth and fifth switches 343, 344, 746, 747, and 848 operate in the following manner to provide a downconverted signal output to the output port 840*c*. In a first condition, one of the non-downconverted signals 828$_1$ is supplied to the downconverter circuit first input port 840*a*, downconverted, and supplied to the output port 840*c*. In this condition, first and third switches 343 and 746 are controlled to a closed state, and the second, fourth, and fifth switches 344, 747 and 846 are controlled to an open state. The second buffer amplifier 345*b* may be deactivated to increase signal isolation and reduce power consumption.

In a second condition, one of non-downconverted signals 828$_2$ supplied to the second switch matrix 810$_2$ is supplied to the downconverter circuit second input port 840*b*, downconverted, and supplied to the output port 840*c*. In this condition, second and third switches 344 and 746 are controlled to a closed state, and the first, fourth and fifth switches 343, 747, and 848 are controlled to an open state. The first buffer amplifier 345*a* may be deactivated to increase signal isolation and reduce power consumption.

In a third condition, one of the frequency portions (e.g., the "H" or "L" band signals) of the pre-downconverted signal 821 is supplied to the first input port 840*a* via the first switch matrix 810$_1$, and supplied directly to the output port 840*c*. In this condition, the first, second, third and fifth switches 343, 344, 746, and 848 are controlled to an open state, and the fourth switch 747 is controlled to a closed state. The oscillator 341, mixer 342, and buffer amplifiers 345*a*-345*c* may also be deactivated in this condition to increase signal isolation and reduce power consumption.

In a fourth condition, one of the frequency portions (e.g., the "H" or "L" band signals) of the pre-downconverted signal 821 is supplied to the second input port 840*b* via the second switch matrix 810$_2$, and supplied directly to the output port 840*c*. In this condition, the first, second, third and fourth switches 343, 344, 746, and 747 are controlled to an open state, and the fifth switch 848 is controlled to a closed state. The oscillator 341, mixer 342, and buffer amplifiers 345*a*-345*c* may also be deactivated in this condition to minimize power consumption.

Figure 9A:
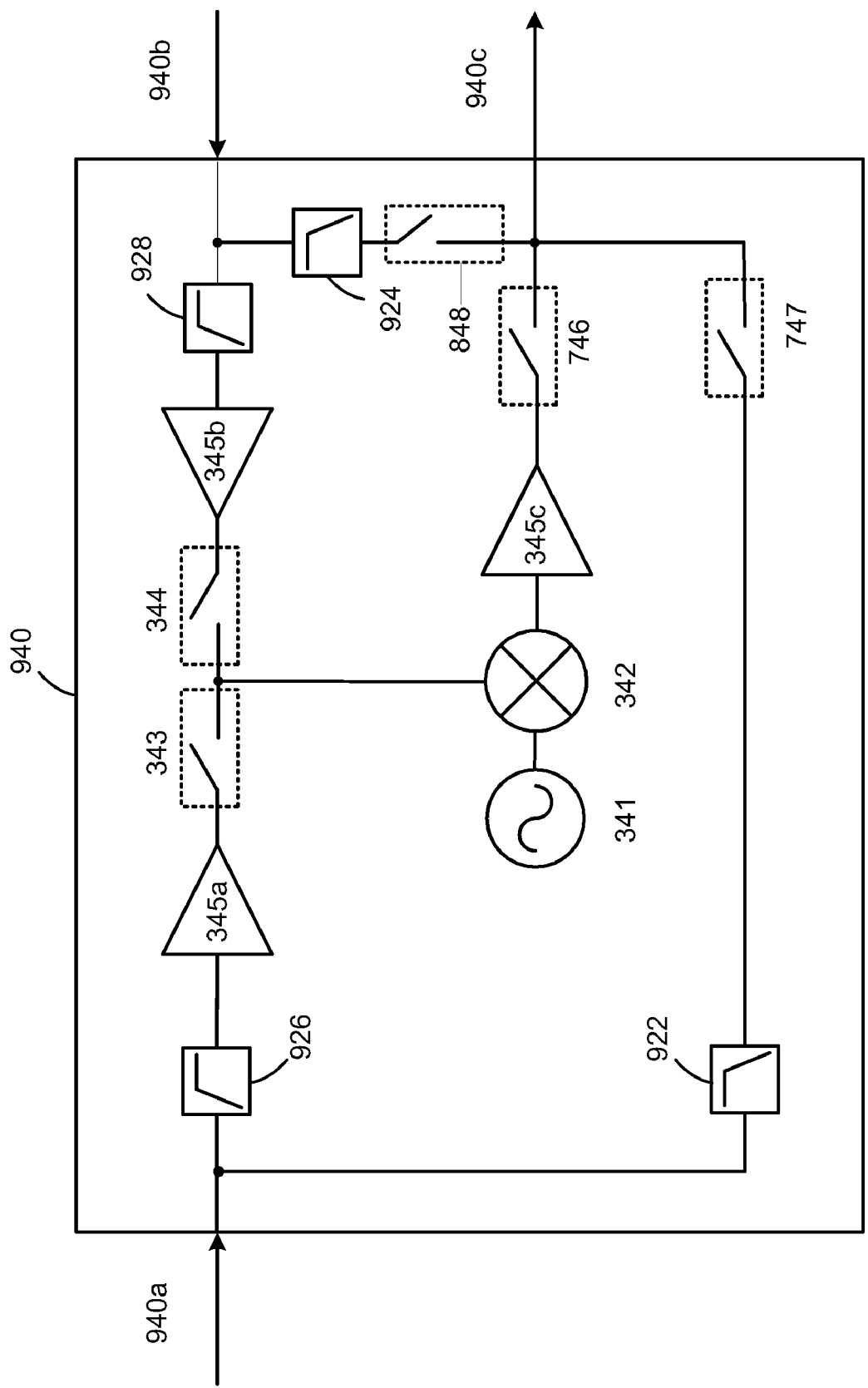
FIG. 9A illustrates an alternative embodiment of the downconverter circuit illustrated in FIG. 8B in accordance with one embodiment of the present invention.

FIG. 9A illustrates a further exemplary downconverter circuit 940 in accordance with one embodiment of the present invention. The circuit arrangement is similar to that of the downconverter circuit 840 shown in FIG. 8B, with the addition of filters 922, 924, 926, and 928, as shown. Power and control signals (not shown in order to simplify the drawing) are routed to each of the components to activate and control the operating states of such components to perform the operations as described herein.

The exemplary downconverter circuit 940 includes two low pass filters 922 and 924 coupled along the signal path taken by portions of the pre-downconverted signal 821, the first low pass filter 922 coupled along the signal path from first input port 940*a*(when, for example, a portion of the pre-downconverted signal 821 is routed via the first switch matrix 810$_1$), and the second low pass filter 924 coupled along the signal path from the second input port 940*a* (when, for example, a portion of the pre-downconverted signal 821 is routed via the second switch matrix 810$_2$).

High pass filters 926 and 928 are coupled along the signal paths which the non-downconverted signals 828$_1$ and 828$_2$ propagate; highpass filter 926 coupled along the signal path which signal 828$_1$ (supplied via the first switch matrix 810$_1$) propagates, and highpass filter 928 coupled along the signal path which signal 828$_2$ (supplied via the second switch matrix 810$_2$) propagates. Of course, other filter types (bandpass, bandstop, etc.) may be implemented additionally or alternative to those shown.

Figure 9B:
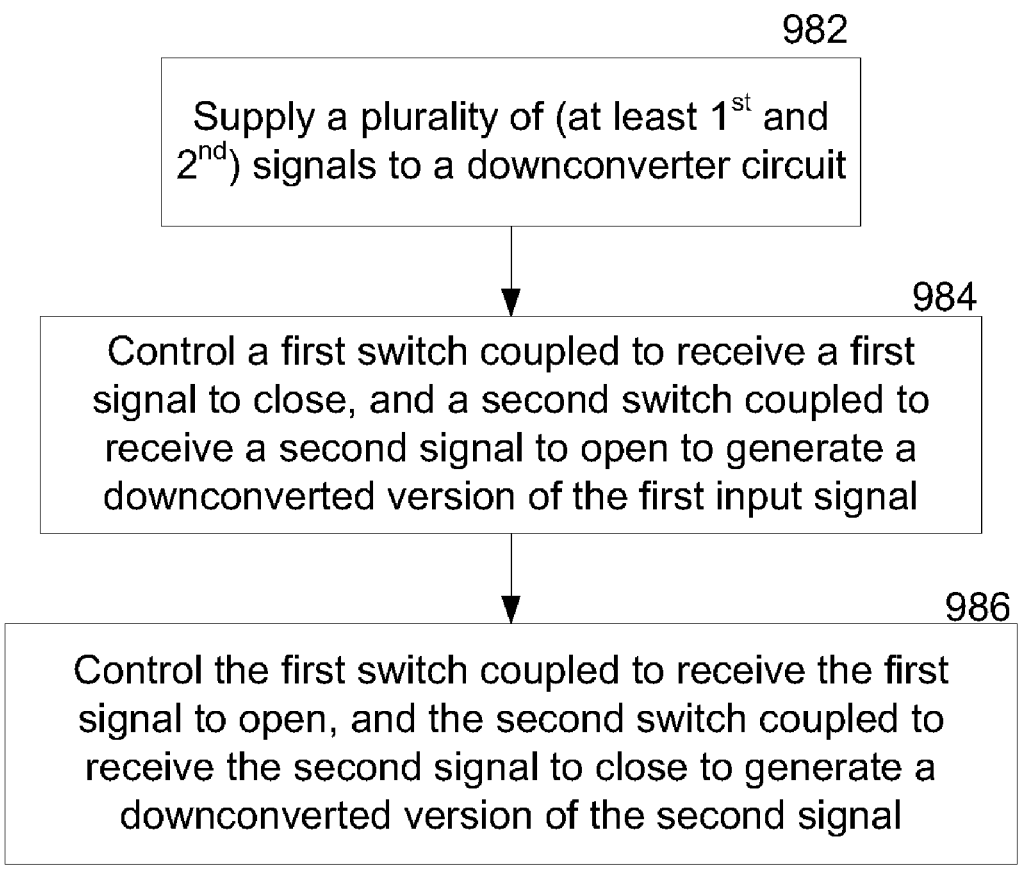
FIG. 9B illustrates a method for operating a downconverter circuit in accordance with the present invention.

FIG. 9B illustrates a method for operating a downconverter circuit in accordance with the present invention. Initially at 982, a plurality of signals is supplied to a downconverter circuit, each signal supplied to a respective switch. In the exemplary downconverter circuits of FIG. 3B, two signals are supplied to downconverter ports 340*a* and 340 and to first and second switches 343 and 344. In alternative embodiments, additional switches may be employed to receive additional signals for downconversion.

At 984, a first of the plurality of switches (e.g., 343) is controlled to a closed state to switchable coupled a first of the plurality of signals (e.g., the signal received at input 340*a*) to a mixer (e.g., 342) within the downconverter circuit, thereby downconverting the first signal to a predefined frequency (e.g., an upper or lower L-band frequency range), and a second of the plurality of switches (344) is controlled to an open state to decouple a second of the plurality of signals (e.g., the signal received at the input port 340*b*) from the mixer. In other embodiments in which three or more input signals are supplied to each downconverter circuit, the downconverter circuit implementing a respective three or more switches coupled to receive said 3 or more signals, all of the switches except the switch coupled to the desired input signal are controlled in an open state.

At 986, the second of the plurality of switches (e.g., 344) is controlled to a closed state to switchable coupled the second of the plurality of signals (e.g., the signal received at input 340*b*) to the mixer (e.g., 342) within the downconverter circuit, thereby downconverting the second signal to a predefined frequency (e.g., an upper or lower L-band frequency range), and the first of the plurality of switches (344) is controlled to an open state to decouple the first of the plurality of signals (e.g., the signal received at the input port 340*a*) from the mixer. As noted above, in other embodiments in which three or more input signals are supplied to each downconverter circuit, the downconverter circuit implementing a respective three or more switches coupled to received said 3 or more signals, all of the switches except the switch coupled to the desired input signal are controlled in an open state.

Figure 10:
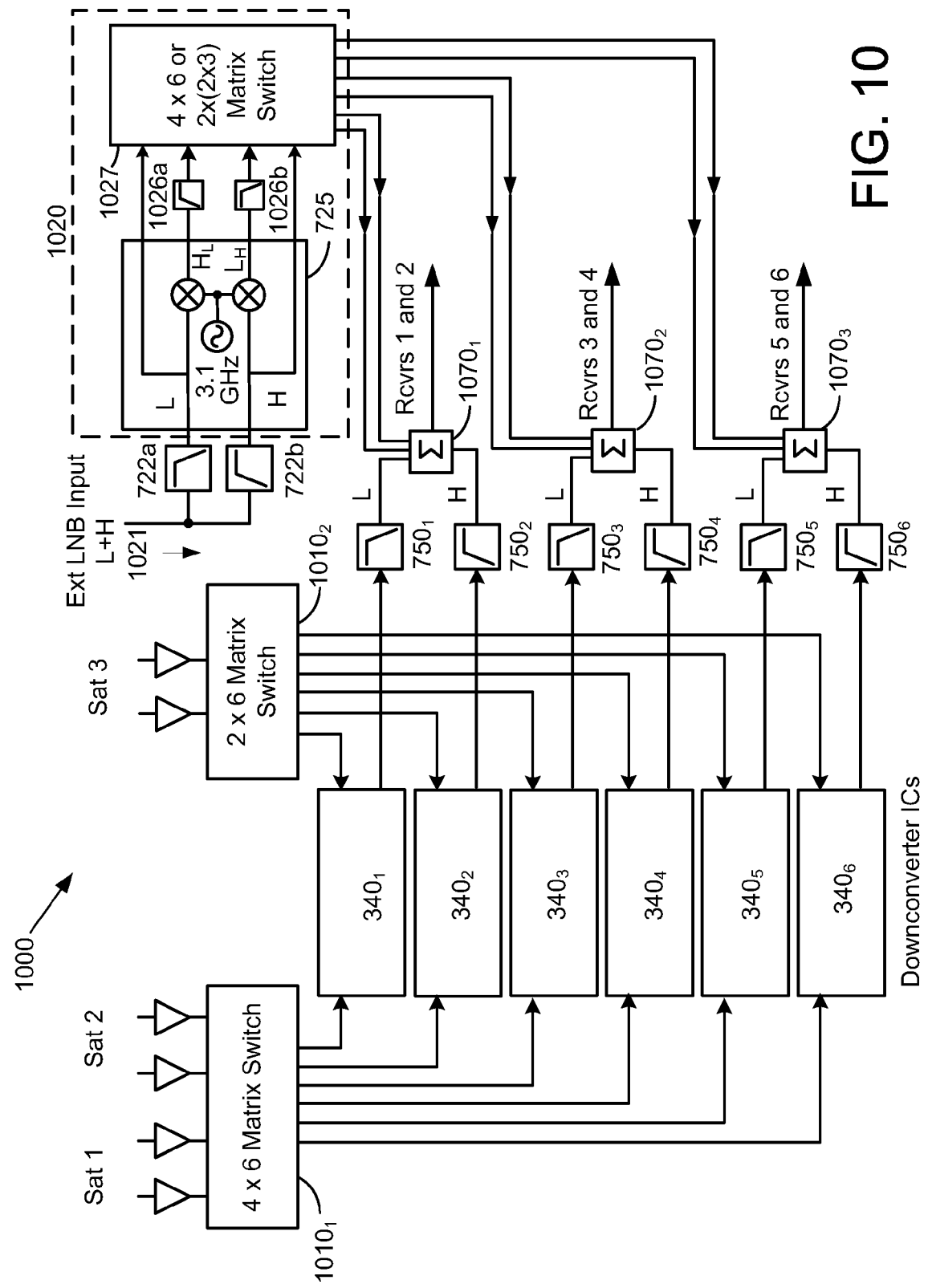
FIG. 10 illustrates a further exemplary embodiment of a frequency translation and signal distribution system in accordance with an embodiment of the present invention.

FIG. 10 illustrates a further exemplary embodiment of a frequency translation and signal distribution system 1000 in accordance with an embodiment of the present invention. Similar to systems 700 and 800 of FIGS. 7A and 8A, respectively, system 1000 is operable to selectively include portions of a pre-downconverted signal 1021 into the construction of an output composite signal. Power and control signals (not shown in order to simplify the drawing) are routed to each of the components to activate and control the operating states of such components to perform the operations as described herein.

As shown, system 1000 includes first and second switch matrices 1010$_1$ and 1010$_2$, exemplary shown as 4×6 ad 2×6 switch matrices, respectively. Signal supply circuitry 1020 includes previously-described filters 722*a* and 722*b* for recovering particular portions of the pre-downconverted signal (shown as low and high band portions of the supplied L-band signal), and frequency converter 725 for translating the low and high frequency components either to substantially the same frequency or to its high/low frequency counter-part.

Signal supply circuitry 1020 additionally includes filters 1026*a* and 1026*b*, and switch matrix 1027. Filter 1026*a* is illustrated as a high pass filter operable to extract primarily the high frequency components (e.g., the higher L band 1650-2150 MHz) of the low-to-high frequency translated signal which is output from the frequency converter 725. Filter 1026b is a low pass filter operable to extract primarily the low frequency components (e.g., the lower L-band 950-1450 MHz) of the high-to-low frequency translated signal which is output from the frequency converter 725. Switch matrix 1027 includes four inputs and six outputs (either via one 4×6 switch matrix or two 2×6 switch matrices), each input coupled to a respective one of the frequency converters four outputs, and six outputs, whereby an output pair is coupled as inputs to each of the signal combiners $1070_1$-$1070_3$. Switch matrix 1027 is operable to switch a signal on any of its four input ports to any one or more of its output ports, thereby providing any signal component of the supplied signal 1021 (e.g., the lower or high band L-band signals L or H) to any one or more of the composite signals constructed by signal combiners $1070_1$-$1070_3$.

In a particular embodiment, signal muting circuitry (examples of which are illustrated in FIGS. 2C and 2D) are implemented both in the switch matrix 1027 and within each of the downconverter circuits $340_1$-$340_6$, such that only one signal component within a particular frequency range (e.g., only one lower L-band frequency signal and only one higher L-band frequency signal) is processed by (i.e., combined onto a composite signal) each signal combiner $1070_1$-$1070_3$. The signal muting circuitry may be alternatively employed in any of the switch matrices $1020_1$, $1020_2$, 1027, downconverter circuits $340_1$-$340_6$, and/or within the signal combiners $1070_1$-$1070_3$ in order to provide only one signal within a particular frequency range to the composite signal construction process.

In the exemplary embodiment shown, downconverter circuits $340_1$-$340_6$ are implemented according to the architecture shown in FIG. 3B, although the downconverter circuits 740 or 840 illustrated in FIGS. 7B and 8B, respectively, may be alternatively employed in accordance with the invention. Further optionally filters $750_1$-$750_6$ may be employed to further reduce the presence of adjacent signals.

Figure 11:
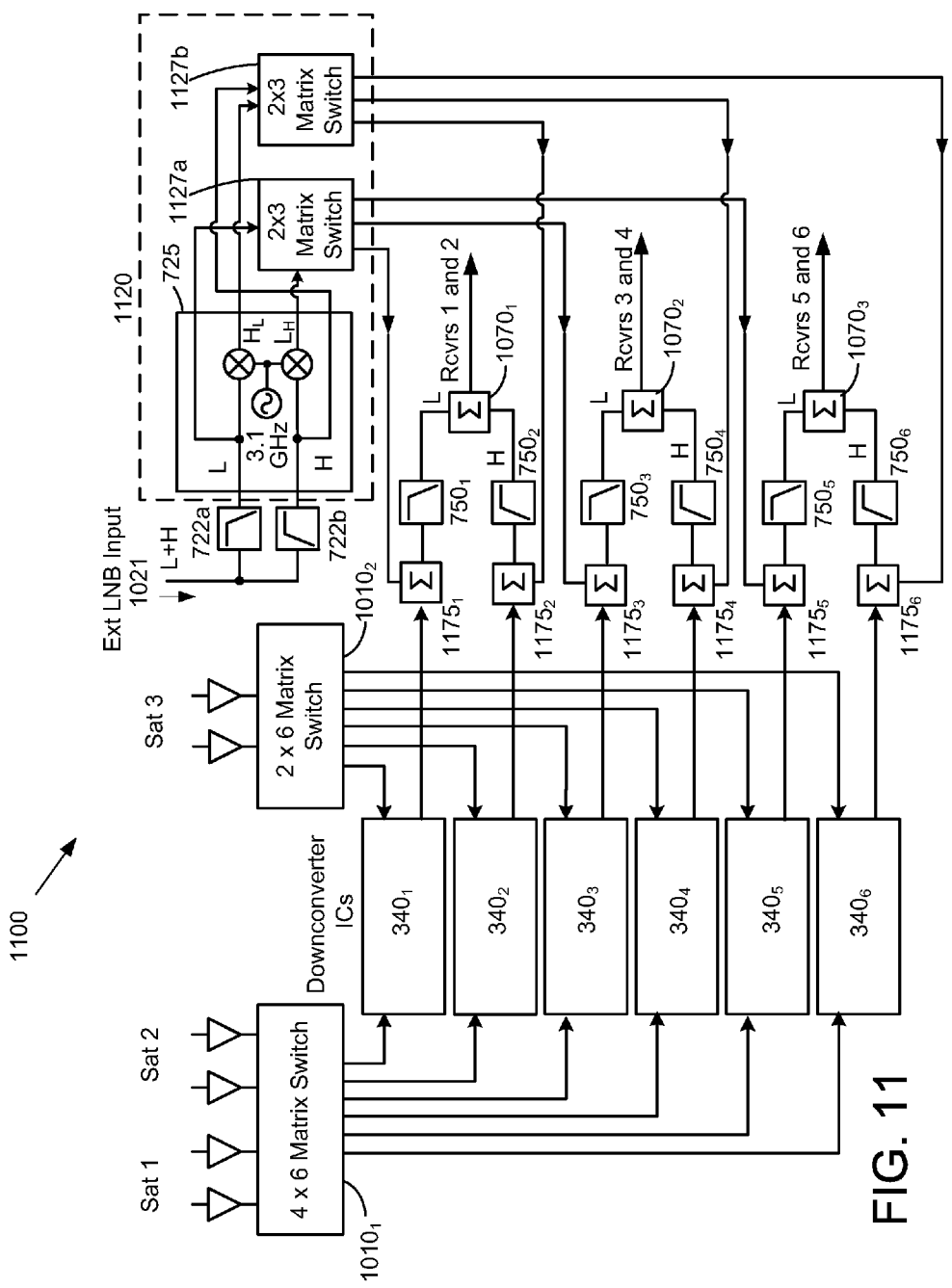
FIG. 11 illustrates a further exemplary embodiment of a frequency translation and signal distribution system in accordance with an embodiment of the present invention.

FIG. 11 illustrates a further exemplary embodiment of a frequency translation and signal distribution system in accordance with an embodiment of the present invention. Similar to system 1000 of FIG. 10, system 1100 illustrates two 2×6 matrices 1127a and 1127b as a replacement for single 4×6 switch matrix 1027 in system 1000. Additionally, signal combiners $1175_1$-$1175_6$ are implemented in a first stage combination arrangement in which signals output from switch matrices 1127a and 1127b are combined with the outputs from downconverter circuits $340_1$-$340_6$. A second stage combining process is performed by signal combiners $1070_1$-$107_6$ to provide the final composite signal. Power and control signals (not shown in order to simplify the drawing) are routed to each of the components to activate and control the operating states of such components to perform the operations as described.

In the exemplary embodiment shown, downconverter circuits $340_1$-$340_6$ are implemented according to the architecture shown in FIG. 3B, although the downconverter circuits 740 or 840 illustrated in FIGS. 7B and 8B, respectively, may be alternatively employed in accordance with the invention. Further exemplary, signal muting circuitry (examples of which are illustrated in FIGS. 2C and 2D) may be implemented in any one or more of the switch matrices $1020_1$, $1020_2$, 1127a, 1127b, the downconverter circuits $340_1$-$340_6$, signal combiners $1175_1$-$1175_6$ and/or signal combiners $1070_1$-$1070_3$, such that only one signal component within a particular frequency range (e.g., only one lower L-band frequency signal and only one higher L-band frequency signal) is processed (i.e., combined to form a final composite signal) by each signal combiner $1070_1$-$1070_3$.

Figure 12:
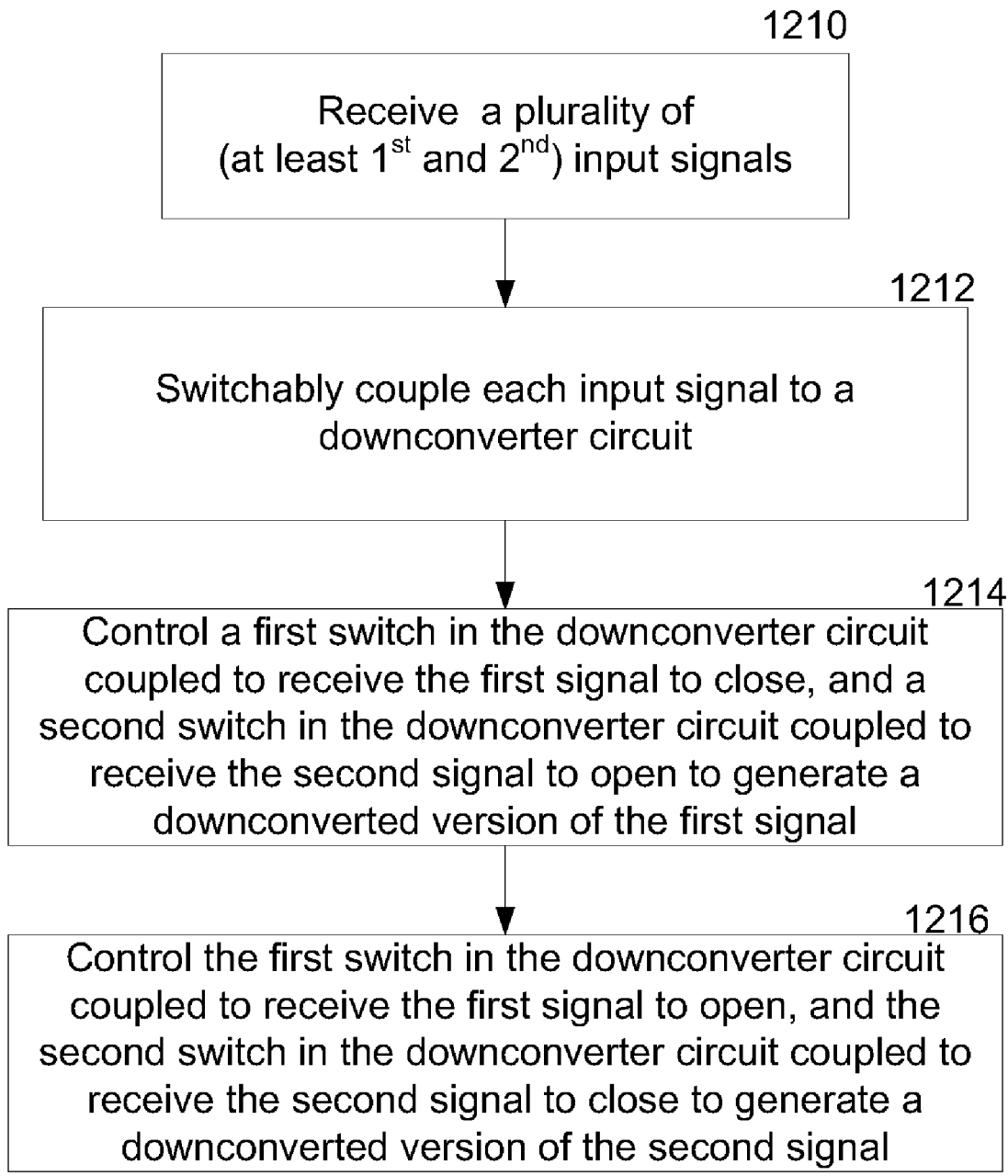
FIG. 12 illustrates a method for performing frequency translation and signal distribution in accordance with one embodiment of the present invention.

FIG. 12 illustrates a method for performing frequency translation and signal distribution in accordance with one embodiment of the present invention. At 1210, a plurality of input signals is received. At 1212, each of the plurality of input signals are switchably coupled to one ($340_1$) of a plurality of downconverter circuits ($340_1$-$340_6$), said downconverter circuit ($340_1$) including a first switch (343) coupled to receive a first of the plurality of input signals, a second switch (344) coupled to receive a second of the plurality of input signals, and a mixer circuit (342) operable to downconvert each of the plurality of input signals to a predefined downconverted frequency.

At 1214, the first switch (343) is controlled to a closed state to switchable couple the first signal to the mixer circuit (342) and controlling the second switch (344) to an open state, whereby said mixer circuit (342) downconverts the first signal to the predefined downconverted frequency. At 1216, the first switch (343) is controlled to an open state, and the second switch (344) to a closed state to switchable couple the second signal to the mixer circuit (342), whereby said mixer circuit (342) downconverts the second signal to the predefined downconverted frequency.

Figure 13B:
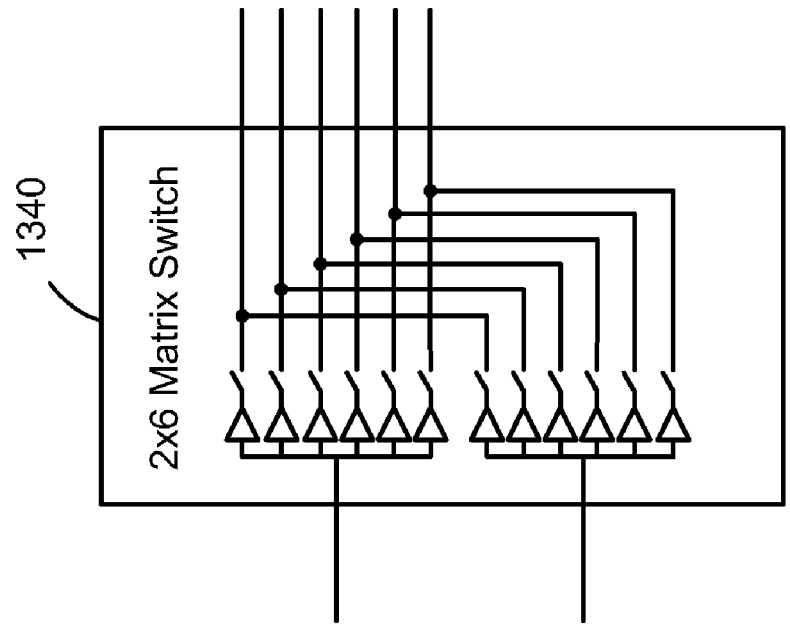
FIG. 13B illustrates an exemplary 2×6 switch matrix which can be implemented within the present invention.
Figure 13A:
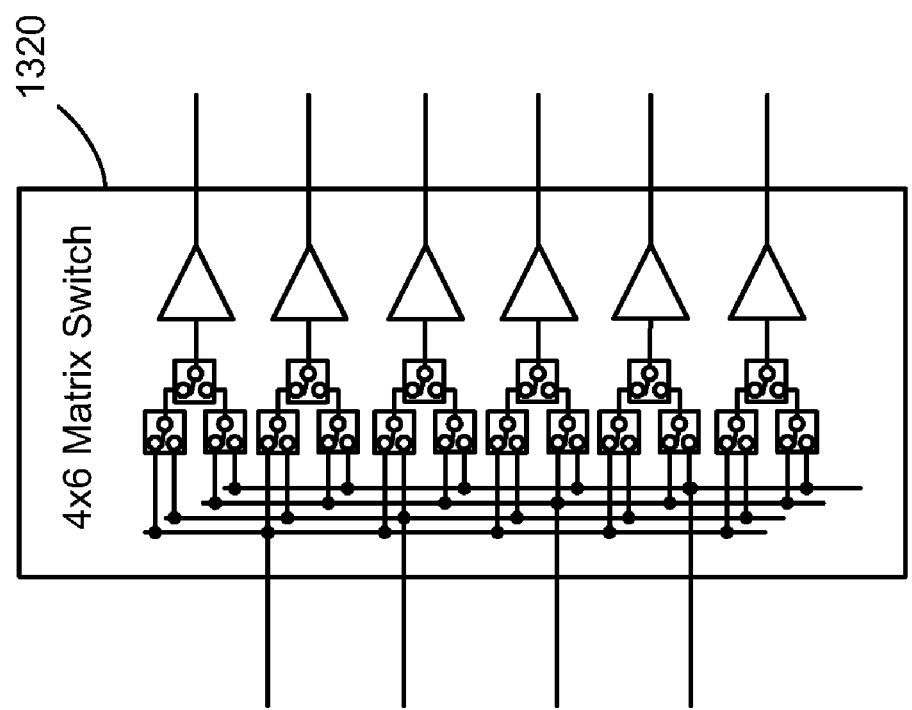
FIG. 13A illustrates an exemplary 4×6 switch matrix which can be implemented within the present invention.

FIG. 13A illustrates an exemplary 4×6 switch matrix 1320 which can be implemented within the present invention. The 4×6 switch matrix 1320 employs a topology of cascaded single-pole-double-through (SPDT) RF switches. Those skilled in the are will appreciate that other switch sizes, smaller or larger, can be constructed with this topology.

FIG. 13B illustrates an exemplary 2×6 switch matrix 1340 which can be implemented within the present invention. The 2×6 switch matrix 1340 employs a topology of parallel-coupled single-pole-double-through (SPDT) RF switches. Those skilled in the are will appreciate that other switch sizes, smaller or larger, can be constructed with this topology.

Figure 14:
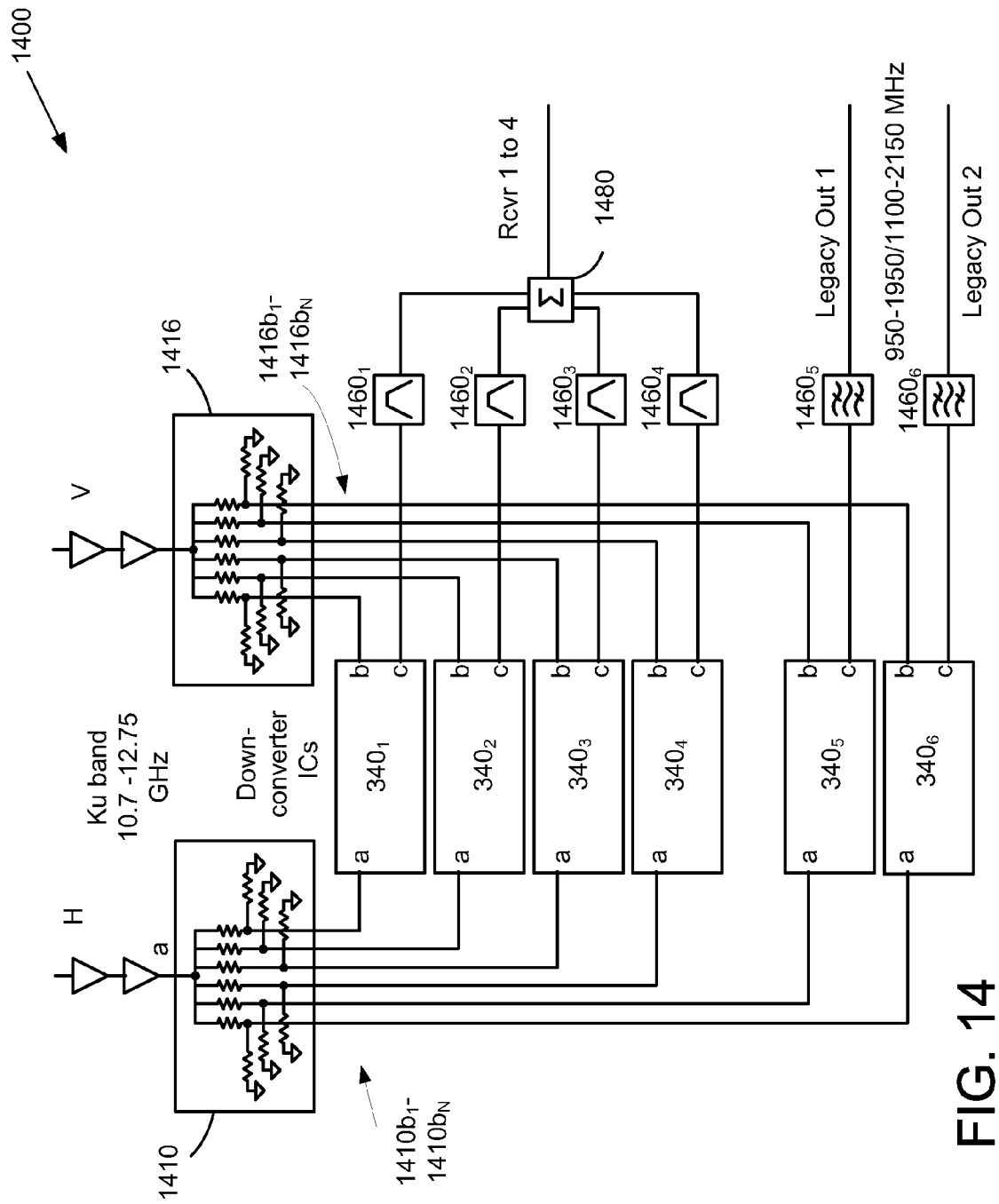
FIG. 14 illustrates a further exemplary embodiment of a frequency translation and signal distribution system in accordance with an embodiment of the present invention.

FIG. 14 illustrates a further exemplary embodiment of a frequency translation and signal distribution system 1400 in accordance with an embodiment of the present invention. The exemplary system 1400 includes first and second signal matrices 1410 and 1416, each implemented as a resistive divider circuit, six downconverter circuits (implemented as downconverter circuits 340 illustrated in FIG. 3B in the illustrated embodiment, although the downconverter circuits 740 or 840 illustrated in FIGS. 7B and 8B, respectively. may be alternatively employed), six filters $1460_1$-$1460_6$, and one combiner 1480. Power and control signals (not shown in order to simplify the drawing) are routed to each of the components to activate and control the operating states of such components to perform the operations as described herein.

Particularly, the first signal matrix 1410 is realized as an N-way resistive divider circuit, and includes a first port 1410a for receiving a first signal, and a plurality of N isolated second ports $1410b_1$-$1410b_N$. In a similar arrangement, the second signal matrix 1416 is realized as an N-way resistive divider circuit, and includes a first port 1416a for receiving a second signal and a plurality of N isolated second ports $1416b_1$-$1416b_N$. Each of the six downconverter circuits $340_1$-$340_6$ having a first input 340a coupled to a respective one of the six output ports $1410b_1$-$1410b_N$ of the first N-way resistive divider 1410, a second input 340b coupled to a respective one of the N output ports $1416b_1$-$1416b_N$ of the second N-way resistive divider 1416, and an output 340c for providing a downconverted output signal. Four of the output signals from downconverter circuits $340_1$-$340_4$ are supplied to a signal combiner 1480, the signal combiner 1480 operable to construct a composite signal which is supplied to receivers (exemplary four, although a greater or fewer number may be alternatively employed).

In an exemplary application, the system 1400 is operable as a satellite frequency translation system for receiving input from one satellite in the frequency range 10.7-12.75 GHz. The output for receivers 1 through 4 is a channel-stacked type on a single cable, while each "legacy output" provides a 1-GHz wide IF signal block, switched between two ranges: 950-1950 MHz and 1100-2150 MHz, corresponding to the input sub-ranges 10.7-11.7 GHz and 11.7-12.75 GHz, respectively. The switching of the ranges in legacy outputs is achieved by tuning the LOs 341 inside the downconverters 340₅ and 340₆ to the required frequencies, in this exemplary case to two fixed frequencies, 9.75 GHz and 10.6 GHz. On the other hand, the downconverters 340₁ through 340₄ are agile with the ability to tune to different input channels by tuning the frequency of LOs 341 with required step resolution. The downconverters 340₁-340₄ convert the desired signals from selected sources to frequencies centered at the respective bandpass filters 1460₁-1460₄. The signals from bandpass filters 1460₁-1460₄ are combined in combiner 1480, thus forming the channel-stacked signal which is distributed to Receivers 1 through 4 on a single cable.

In the exemplary system 1400 of FIG. 14, high isolation between output ports at RF frequencies of the first and second n-way resistive dividers 1410 and 1416 is advantageous in order to reduce undesired signals leaking back into each downconverter from all other downconverters coupled to the same resistive divider circuit. Primarily LO signals leaking back from each downconverter 340 through RF input ports falling in-band or on the image frequencies are problematic. The signal splitters commonly used, especially at high frequencies (e.g., Ku/Ka band frequencies), such as a well-known Wilkinson divider, will typically provide isolation between the splitter's output ports on the order of 20 dB, which may not be sufficient to suppress unwanted leakage to the needed level. The resistive divider networks 1410 and 1416 are constructed to solve this problem, whereby a plurality of impedance transformers are coupled in parallel to provide both the required impedance match and improved output-to-output port isolation.

FIGS. 15 and 16 illustrate details of an exemplary N-way resistive divider circuit in accordance with one embodiment of the present invention. Referring initially to FIG. 15, the divider circuit 1500 has a first (e.g., an input) port 1500a and a plurality of N isolated second (e.g., output) ports 1500b₁-1500bₙ. In the exemplary system embodiment 1400 of FIG. 14, each divider circuit 1410 and 1416 includes six output ports, although a different number of output ports (two, three, four, five, seven, eight, nine, 10, 12, 14, 18, 20, 100 or more) may be alternatively employed in accordance with the present invention. Furthermore, the divider circuit may be implemented in a variety of different circuit topologies, e.g., single ended or differential signal path designs, and configured with discrete components, or monolithically formed on an integrated circuit.

As shown, the divider circuit 1500 includes plurality of N parallel-coupled impedance transformers 1520₁-1520ₙ, each impedance transformers including (referring to FIG. 16) a first resistor Rs 1522 having a first node 1522a coupled to a common input junction 1520a, and a second node 1522b, and a second resistor Rp 1524 having a first node 1524a coupled to the second node of the first resistor 1522b, and a second node 1524b coupled to a signal ground 1530. The number of N parallel-coupled impedance transformers may vary depending upon the desired number of output paths needed.

In the exemplary system 1400 shown in FIG. 14, each of the divider circuits 1410 and 1416 employed six impedance transformers, although in other embodiments, two, three, four, five, seven, eight, nine, 10, 12, 14, 16, 20, 50, 100 or more may be implemented.

The values of the first and second resistors Rs and Rp will largely determine the impedance looking into the first port 1500a and each of the second ports 1500b₁-1500bₙ, as well as the isolation between different second ports 1500b₁-1500bₙ. In a specific embodiment, the value of the first resistor Rs 1522 is computed as substantially the value defined by the equation:

$$Rs = \sqrt{N \cdot (N-1)} \cdot R_{desired} \qquad \text{eq. (1)}$$

where $R_{desired}$ is the value of the input impedance Zin looking into at the first port (1500a) of the resistive divider circuit 1500, and N is the number of impedance transformers 1520₁-1520ₙ present in the N-way resistive divider circuit 1500.

Additionally, the value of the second resistor Rp 1524 is computed as substantially the value defined by the equation:

$$Rp = \sqrt{N/(N-1)} \cdot R_{desired} \qquad \text{eq. (2)}$$

Using the aforementioned equations, the nominal resistance values of the first and second resistors Rs and Rp (rounded to whole numbers) of the resistive divider in a 50 ohm system for N=2 through N=10 may be determined as follows:

| N | Rs (Ohms) | Rp (Ohms) |
|---|---|---|
| 2 | 71 | 71 |
| 3 | 122 | 61 |
| 4 | 173 | 58 |
| 5 | 224 | 56 |
| 6 | 274 | 55 |
| 7 | 324 | 54 |
| 8 | 374 | 53 |
| 9 | 424 | 53 |
| 10 | 474 | 53 |

Those skilled in the art will appreciate that the resistance values settled upon for a design of the divider circuit 1500 may vary from the foregoing computed values, depending, for example, upon the availability of particular resistance values, mismatches between the first and second port impedances, or between different second port impedances. In such instances, the foregoing computed values represent a starting value from which optimal values can be collectively achieved, using for example, circuit simulation software. In one embodiment, the values of each of the first and second resistors Rs and Rp may vary up to ±50% from the foregoing calculated values. In a further embodiment, the values for each of the first and second resistors Rs and Rp may vary up to ±20% from the foregoing calculated values, and in still a further embodiment, the values of the first and second resistors Rs and Rp may vary up to ±10% from the foregoing calculated values.

The impedance transformation provide by transformers 1520₁-1520ₙ is designed such that parallel combination closely approximates the nominal line impedance at the common junction. In a particular embodiment, each impedance transformer 1520 is designed to transform the line impedance (e.g. 50 Ohms) into N-times higher impedance, where N is the number of outputs. The nominal resistor values achieving N:1 impedance transformation can be easily obtained, analytically (e.g., using eq. (1) and (2)), or by some other means, such as circuit simulator/optimizer. The parallel connection of N impedance transformers $1520_1$-$1520_N$ at the input junction scales the N times higher impedance of each impedance transformer 1520 back to one-time the line impedance, thus returning the input match to that presented at the input port. For a six-way splitter example shown in FIG. 14, each impedance transformer $1520_1$-$1520_N$ transforms 50 Ohms into 300 Ohms, six of which are connected in parallel, thus returning the input impedance into the splitter of 300/6=50 Ohms. The first resistor Rs of each impedance transformer $1520_1$-$1520_N$ in this example is nominally about 274 Ohms and the second resistor Rp about 55 Ohms. As noted above, resistor values can deviate from the nominal values in order to optimize the performance (improve output-output isolation) and/or match the circuit to particular source and load impedances. Very high isolation can be achieved in this manner, the isolation amounting to about 2 times the insertion loss in dB. The 6-way splitter of FIG. 14 with the aforementioned resistance values for Rs and Rp exhibits about 18 dB of insertion loss, attaining close to 40 dB isolation of the output ports.

In one embodiment of the invention, the input impedance Zin of the resistive divider 1500 has a value of $R_{desired}$. In this embodiment, the value $R_{desired}$ is chosen to be substantially equal to the source impedance in order to obtain good impedance matching at the node. The source impedance (for instance the output of an amplifier) is typically substantially equal to the nominal line impedance (e.g. 50 Ohms or 75 Ohms), and therefore $R_{desired}$ may be computed to approach this line impedance. The output impedance of each of the output ports of the divider (i.e. the impedance Zout looking back into each $1500b_1$-$1500b_N$ ports) is substantially equal to $R_{desired}$, i.e. equal to the input impedance of the divider. In this embodiment, where resistance values are obtained by eq. (1) and (2), the input and output impedances are equal (Zin=Zout).

In other embodiments, the input impedance Zin and the output impedance Zout of the resistive divider may be different. This can be achieved with the present invention resistive divider by using modified resistor values, computed by eq. (1) and (2) where N is substituted by the quantity $$\frac{Z_{in}}{Z_{out}} \cdot N.$$

For stance, if Zin=75 Ohms and Zout=50 Ohms, the quantity 1.5·N is used instead of N in equations (1) and (2) to obtain nominal Rs and Rp values. As noted above, the actual implemented values may differ from these computed values, the implemented values varying up to ±50% of the computed values in one embodiment, or up to ±20% of the computed values in a further embodiment, and up to ±10% of the computed values in a still more specific embodiment.

FIGS. 17A-17C illustrates parasitic capacitance associated with the resistive elements employed in the resistive divider circuit of FIGS. 15 and 16. Referring initially to FIG. 17A, the capacitance represents the parasitic capacitance of the resistor itself, but may include the parasitic capacitance of the circuit traces/soldering pads. To attain high isolation, resistors with low parallel parasitic capacitance are preferred. The reactance of the parasitic capacitance is preferably much smaller than the resistance of the resistor, to reduce undesired shunt effects, i.e. signal bypass around the resistor. However, real resistors with low enough parasitic capacitance may be difficult or impossible to achieve. The effective parasitic capacitance can be lowered by the method of the present invention depicted in FIGS. 17B and 17C.

FIG. 17B illustrates a circuit representation of one embodiment of the present invention's method for reducing effective parasitic capacitance by connecting resistors in series. The figure shows a case of equal type and equal value resistors, each having resistance of R/2 and a parallel parasitic capacitance Cp. The equivalent circuit shows that the series connection results in doubling the resistor value to R, while capacitance is halved to Cp/2. For further improvements in reduction of the parasitic capacitance, this method of the present invention can be embodied with more than two resistors in series, e.g. 3, each having R/3 value, resulting in Cp/3, or 4 resistors, resulting in Cp/4, etc. Furthermore, unequal resistors, or resistors of a different type can be combined, as depicted in FIG. 17C providing additional degree of freedom in design optimization. In a particular embodiment, the first resistor Rs $1522_1$-$1522_N$ includes a plurality of series-coupled resistors in order to reduce the parasitic capacitance, as described above.

Figure 18:
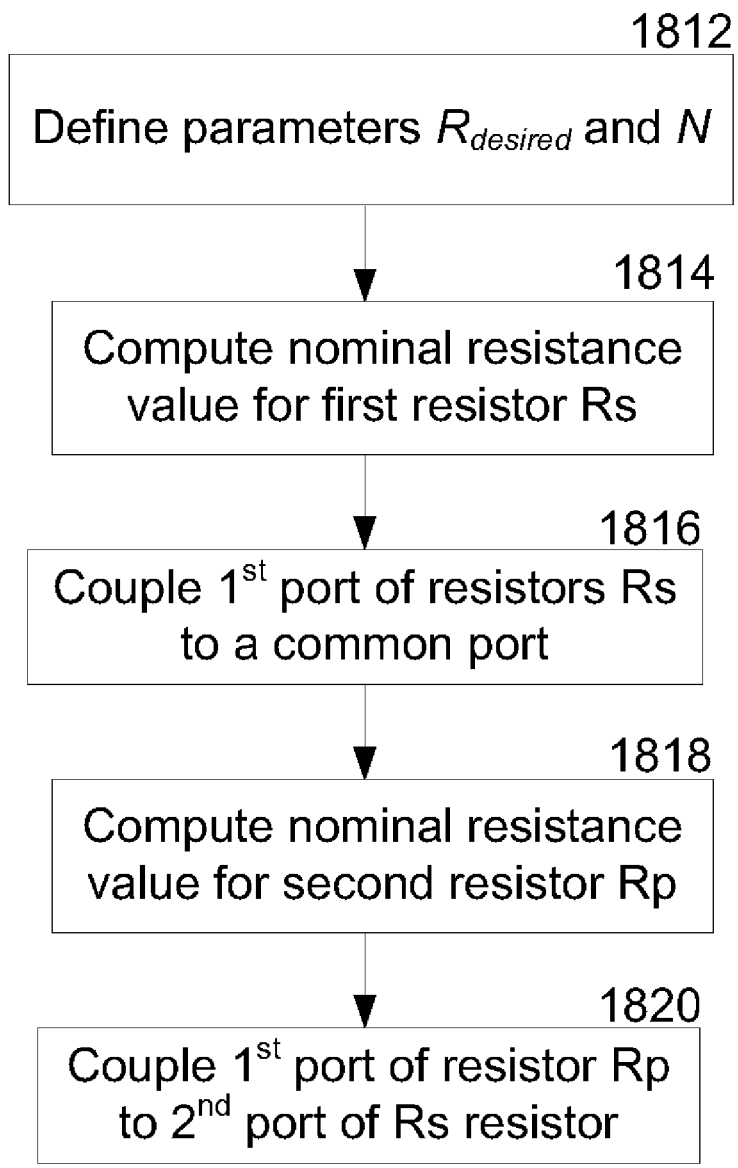
FIG. 18 illustrates a constructing an N-way resistive divider circuit in accordance with one embodiment of the present invention.

FIG. 18 illustrates a method for constructing an N-way resistive divider circuit in accordance with one embodiment of the present invention. Initially at 1812, a desired resistance $R_{desired}$ of the resistive divider circuit (1500, FIG. 15) and the number of N branches of the resistive divider circuit (1500) are defined. In a particular embodiment of the invention, the resistance value $R_{desired}$ corresponds to the desired impedance looking into the first port (1500a) of the N-way resistive divider circuit 1500.

At 1814, a nominal resistance value for a first resistor Rs (1522) is defined using eq. (1) above:

$$Rs = \sqrt{N \cdot (N-1)} \cdot R_{desired}$$

At 1816, a first port (1522a) of each of a plurality of N first resistors Rs is coupled to a common port (1500a), each of the first resistors Rs having a second port (1522b) opposite the common port (1500a).

At 1818, a nominal resistance value for a second resistor Rp (1524) is computed using eq. (2) above:

$$Rp = \sqrt{N/(N-1)} \cdot R_{desired}$$

At 1820, a first port (1524a) of each of a plurality of N second resistors is coupled to the second port (1522b) of a respective one of the N first resistors.

As readily appreciated by those skilled in the art, the described processes may be implemented in hardware, software, firmware or a combination of these implementations as appropriate. In addition, some or all of the described processes may be implemented as computer readable instruction code resident on a computer readable medium, the instruction code operable to program a computer of other such programmable device to carry out the intended functions. The computer readable medium on which the instruction code resides may take various forms, for example, a removable disk, volatile or non-volatile memory, etc., or a carrier signal which has been impressed with a modulating signal, the modulating signal corresponding to instructions for carrying out the described operations.

The terms "a" or "an" are used to refer to one, or more than one feature described thereby. Furthermore, the term "coupled" or "connected" refers to features which are in communication with each other (electrically, mechanically, thermally, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serve to refer to an exemplary embodiment of a claimed feature, and the claimed feature is not limited to the particular embodiment referred to by the reference indicia. The scope of the claimed feature shall be that defined by the claim wording as if the reference indicia are absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A downconverter circuit for a signal distribution and frequency translation system, the downconverter circuit having first and second inputs coupled to receive respective first and second input signals, and an output for providing a downconverted output signal, the downconverter circuit comprising;
   a mixer circuit having a first input coupled to a reference frequency source, a second input, and an output coupled to the downconverter circuit output;
   a first switch having a first port coupled to the downconverter circuit first input, and a second port switchably coupled to the mixer circuit second input; and
   a second switch having a first port coupled to the downconverter circuit second input, and a second port switchably coupled to the mixer circuit second input,
   wherein the first and second switches are complementarily-switched.

2. A downconverter circuit for a signal distribution and frequency translation system, the downconverter circuit having first and second inputs coupled to receive respective first and second input signals, and an output for providing a downconverted output signal, the downconverter circuit comprising;
   a mixer circuit having a first input coupled to a reference frequency source, a second input, and an output coupled to the downconverter circuit output;
   a first switch having a first port coupled to the downconverter circuit first input, and a second port switchably coupled to the mixer circuit second input;
   a second switch having a first port coupled to the downconverter circuit second input, and a second port switchably coupled to the mixer circuit second input; and
   at least one buffer amplifier coupled between the downconverter circuit first input and the first switch, at least one buffer amplifier coupled between the downconverter circuit second input and the second switch, and at least one buffer amplifier coupled between the mixer circuit output and the downconverter circuit output.

3. A downconverter circuit for a signal distribution and frequency translation system, the downconverter circuit having first and second inputs coupled to receive respective first and second input signals, and an output for providing a downconverted output signal, the downconverter circuit comprising;
   a mixer circuit having a first input coupled to a reference frequency source, a second input, and an output coupled to the downconverter circuit output;
   a first switch having a first port coupled to the downconverter circuit first input, and a second port switchably coupled to the mixer circuit second input;
   a second switch having a first port coupled to the downconverter circuit second input, and a second port switchably coupled to the mixer circuit second input;
   a third switch having a first port coupled to the mixer circuit output, and a second port switchably coupled to the downconverter circuit output; and
   a fourth switch having a first port coupled to the downconverter circuit first input, and a second port switchably coupled to the downconverter circuit output.

4. The downconverter circuit of claim 3, further comprising a fifth switch having a first port coupled to the downconverter circuit second input, and a second port switchably coupled to the downconverter circuit output.

5. A frequency translation and signal distribution system, comprising:
   a first signal matrix comprising at least one input port operable to receive a signal and a plurality of output ports, the first signal matrix operable to couple a signal received on said at least one input port to any of the plurality of said output ports;
   a second signal matrix comprising at least one input port operable to receive a signal and a plurality of output ports, the second signal matrix operable to couple a signal received on said at least one input port to any of the plurality of said output ports; and
   a plurality of downconverter circuits, each downconverter having a first input coupled to a respective one of the first matrix output ports, a second input coupled to a respective one of the second matrix output ports, and an output port for providing a downconverted output signal, the downconverter circuit comprising;
   a mixer circuit having a first input coupled to a reference frequency source, a second input, and an output coupled to the downconverter circuit output;
   a first switch having a first port coupled to the downconverter circuit first input, and a second port switchably coupled to the mixer circuit second input; and
   a second switch having a first port coupled to the downconverter circuit second input, and a second port switchably coupled to the mixer circuit second input.

6. The system of claim 5, wherein the first and second signal matrices comprises respective first and second N-way resistive divider circuits, each of the first and second N-way resistive divider circuits having an input port operable to receive a signal and a plurality of output ports, each of the first and second resistive divider circuits including a plurality of N parallel-coupled impedance transformers coupled between the respective input port and output of each of the first and second resistive dividers, each of the plurality of the impedance transformers comprising:
   a first resistor Rs having a first node coupled to a common input junction, and a second node; and
   a second resistor $R_p$ having a first node coupled to the second node of the first resistor, and a second node coupled to a signal ground, wherein the resistance value of each of the first resistors Rs is substantially the value defined by the equation:

$$Rs = \sqrt{N \times (N-1)} \cdot R\text{desired}$$

and wherein the resistance value of each of the second resistors Rp is substantially the value defined by the equation:

$$Rp = \sqrt{N/(N-1)} \cdot R\text{desired}$$

and where $R_{desired}$ is the desired impedance looking into the input port of the respective first or second N-way resistive divider circuit, and N is the number of impedance transformers included within the respective first or second N-way resistive divider circuit.

7. The system of claim 6, wherein each of the first resistors Rs comprises a plurality of series-coupled resistors.

8. The system of claim 5, wherein the first signal matrix includes a plurality of inputs, the first signal matrix further comprising:
   a plurality of signal matrices, each signal matrix comprising at least one input port operable to receive a signal and a plurality of output ports, each of the plurality of signal matrices operable to couple a signal received on said input port to any of the plurality of said output ports; and
   a plurality of combiners, each combiner having a plurality of inputs and a combiner output, wherein each combiner input port is coupled to a respective one output port of one of the plurality of matrices, whereby the combiner input ports are coupled to respective output ports of different matrices, and wherein each combiner output port is coupled to a first input or second input of a respective one of the downconverter circuits.

9. The system of claim 8, wherein the plurality of signal matrices comprises:
   a first switch matrix having at least one input port coupled to receive a respective at least one signal, and at least N output ports, the first switch matrix operable to couple a signal received on the at least one input port to any of the at least N output ports; and
   a second switch matrix having at least one input port coupled to receive a respective at least one signal, and at least N output ports, the second switch matrix operable to couple a signal received on the at least one input port to any of the at least N output ports; and
   wherein the plurality of combiners comprises a respective at least N combiners, each of the plurality of N signal combiners including a first input coupled to a respective one of the N outputs of the first switch matrix, and a second input coupled to a respective one of the N outputs of the second switch matrix.

10. The system of claim 9, wherein the first signal matrix includes a plurality of input ports, whereby at least one of the plurality of input ports is configured to receive a signal operating within a first frequency band and a signal operating within a second frequency band.

11. The system of claim 10, further comprising circuitry for supplying said signals operating within said first and second frequency bands, said circuitry comprising:
   a frequency converter having a plurality of inputs coupled to receive the signal operating within the first frequency band, and a plurality of outputs, the frequency converter operable to either: (i) pass the signal operable within the first frequency band there through without frequency translation, or (ii) frequency translate said signal from a first part of the first frequency band to a second part of the first frequency band; and
   a plurality of signal lines, each coupled to receive the signal operating within the second frequency band, wherein a respective one of the frequency converter outputs is coupled to a respective one of the signal lines, whereby the signal operating within the first frequency band is combined with the signal operating within the second frequency band.

12. The system of claim 11, wherein the frequency converter further includes:
   a first frequency converter mixer coupled to receive the signal operating at the first part of the first frequency band, the first frequency converter mixer operable to frequency translate said signal input thereto to the second part of the first frequency band;
   a second frequency converter mixer coupled to receive the signal operating at the second part of the first frequency band, the second frequency converter mixer operable to frequency translate said signal input thereto to the first part of the first frequency band;
   a first bypass signal line coupled to receive the signal operating at the first part of the first frequency band, the first bypass signal line coupled to bypass the first frequency converter mixer; and
   a second bypass signal line coupled to receive the signal operating at the second part of the first frequency band, the second bypass signal line coupled to bypass the second frequency converter mixer.

13. The system of claim 10, wherein the second signal matrix includes a plurality of input ports, whereby at least one of the plurality of input ports is configured to receive a signal operating within a first frequency band and a signal operating within a second frequency band.

14. The system of claim 13, further comprising circuitry for supplying said signals operating within said first and second frequency bands, said circuitry comprising:
   a frequency converter having a plurality of inputs coupled to receive the signal operating within the first frequency band, and a plurality of outputs, the frequency converter operable to either: (i) pass the signal operable within the first frequency band there through without frequency translation, or (ii) frequency translate said signal from a first part of the first frequency band to a second part of the first frequency band; and
   a plurality of signal lines, each coupled to receive the signal operating within the second frequency band, wherein a respective one of the frequency converter outputs is coupled to a respective one of the signal lines, whereby the signal operating with the first frequency band is combined with the signal operating within the second frequency band.

15. The system of claim 14, wherein the frequency converter further includes:
   a first frequency converter mixer coupled to receive the signal operating at the first part of the first frequency band, the first frequency converter mixer operable to frequency translate said signal input thereto to the second part of the first frequency band;
   a second frequency converter mixer coupled to receive the signal operating at the second part of the first frequency band, the second frequency converter mixer operable to frequency translate said signal input thereto to the first part of the first frequency band;
   a first bypass signal line coupled to receive the signal operating at the first part of the first frequency band, the first bypass signal line coupled to bypass the first frequency converter mixer; and
   a second bypass signal line coupled to receive the signal operating at the second part of the first frequency band, the second bypass signal line coupled to bypass the second frequency converter mixer.

16. The system of claim 5, further comprising at least one signal combiner, comprising:
- a first input coupled to a respective output port of a first of the plurality of downconverter circuits; and
- a second input coupled to a respective output port of a second of the plurality of downconverter circuits, wherein the signal combiner is further configured to receive a signal operating within a predefined frequency band, whereby a downconverted signal output from the first or second downconverter circuits is included within said predefined frequency band.

17. The system of claim 16, further comprising circuitry for supplying said signal operating within the predefined frequency band, said circuitry comprising:
- a frequency converter having a plurality of inputs coupled to receive the signal operating within the predefined frequency band, and a plurality of outputs, the frequency converter operable to either: (i) pass the signal operable within the predefined frequency band there through without frequency translation, or (ii) frequency translate said signal from a first part of the predefined frequency band to a second part of the predefined frequency band.

18. The system of claim 17, wherein the frequency converter further includes:
- a first frequency converter mixer coupled to receive the signal operating at the first part of the predefined frequency band, the first frequency converter mixer operable to frequency translate said signal input thereto to the second part of the predefined frequency band;
- a second frequency converter mixer coupled to receive the signal operating at the second part of the predefined frequency band, the second frequency converter mixer operable to frequency translate said signal input thereto to the first part of the predefined frequency band;
- a first bypass signal line coupled to receive the signal operating at the first part of the predefined frequency band, the first bypass signal line coupled to bypass the first frequency converter mixer; and
- a second bypass signal line coupled to receive the signal operating at the second part of the predefined frequency band, the second bypass signal line coupled to bypass the second frequency converter mixer.

19. The system of claim 18, further comprising a frequency converter signal matrix having a plurality of inputs and a plurality of outputs, each input coupled to a respective one of the first or second frequency converter mixer outputs, or first or second bypass signal lines, and a group of at least two outputs coupled to a respective combiner.

20. In a downconverter circuit having a mixer circuit, and first and second switches, a method for downconverting, to an output frequency, each of the at least first and second signals supplied to the downconverter circuit, the method comprising:
- supplying said at least first and second signals to respective at least first and second switches of said downconverter circuit;
- controlling the first switch to a closed state to switchable couple the first signal to the mixer circuit and controlling the second switch to an open state, whereby said mixer circuit downconverts the first signal to the downconverted output frequency; and
- controlling the first switch to an open state, and the second switch to a closed state to switchable couple the second signal to the mixer circuit, whereby said mixer circuit downconverts the second signal to the downconverted output frequency.

21. The method of claim 20, wherein supplying a first signal to a first switch comprises:
- frequency multiplexing a signal operating within a first frequency band with a signal operating within a second frequency band; and
- providing, as the first signal, the frequency-multiplexed signal to the first switch.

22. The method of claim 20, wherein the downconverter circuit further includes third and fourth switches, the method further comprising:
- controlling the first and third switches to a closed state to switchable couple the first signal to the mixer circuit and controlling the second and fourth switches to an open state, whereby said mixer circuit downconverts the first signal to the downconverted output frequency; or
- controlling the first and third switches to an open state, and the second and fourth switches to a closed state to switchable couple the second signal to the mixer circuit, whereby said mixer circuit downconverts the second signal to the downconverted output frequency; or
- controlling the first, second, and third switches to an open state, and the fourth switch to a closed state to switchably couple the first signal through the downconverter circuit without frequency translation to an output port of the downconverter circuit.

* * * * *